United States Patent
Bao

(10) Patent No.: US 11,995,310 B2
(45) Date of Patent: May 28, 2024

(54) METHOD AND APPARATUS FOR DISPLAYING INTERACTION INTERFACE, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Huifei Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 59 days.

(21) Appl. No.: 17/668,749

(22) Filed: Feb. 10, 2022

(65) Prior Publication Data

US 2022/0164101 A1    May 26, 2022

Related U.S. Application Data

(63) Continuation of application No. PCT/CN2020/129134, filed on Nov. 16, 2020.

(30) Foreign Application Priority Data

Jan. 21, 2020    (CN) .......................... 202010072577.9

(51) Int. Cl.
*G06F 3/048* (2013.01)
*A63F 13/2145* (2014.01)
(Continued)

(52) U.S. Cl.
CPC ...... *G06F 3/04886* (2013.01); *A63F 13/2145* (2014.09); *A63F 13/53* (2014.09);
(Continued)

(58) Field of Classification Search
CPC ....... G06F 3/04886; G06F 2203/04808; A63F 13/2145; A63F 13/53; A63F 2300/1075; A63F 2300/303
See application file for complete search history.

(56) References Cited

U.S. PATENT DOCUMENTS 2,861,910 A * 11/1958 Johnston ................ C08G 63/52
                                                   428/431
3,067,260 A * 12/1962 Frank ...................... C07C 29/86
                                                   568/868
(Continued)

FOREIGN PATENT DOCUMENTS

CN         105980953 A      9/2016
CN         106955489 A      7/2017
(Continued)

OTHER PUBLICATIONS

Effect of Folding Screen on Interactive Design, Interactive Properties, Brief book, Jun. 17, 2019, pp. 1-4, website: www.jianshu.com/p/a26bdld27878.
(Continued)

*Primary Examiner* — Nicholas Augustine
(74) *Attorney, Agent, or Firm* — Sughrue Mion, PLLC

(57) ABSTRACT

A method and apparatus for displaying an interaction interface, a storage medium, and an electronic device are provided. The method includes: displaying a first interaction interface on a front display region of a mobile terminal; detecting a first interaction operation on a back display region, wherein the first interaction operation is used for switching from displaying the first interaction interface on the front display region to displaying a second interaction interface of a target game application; responsive to detecting the first interaction operation, switching from displaying
(Continued)

the first interaction interface on the front display region to displaying the second interaction interface.

20 Claims, 10 Drawing Sheets

(51) Int. Cl.
*A63F 13/53* (2014.01)
*G06F 3/04886* (2022.01)
*G06F 3/01* (2006.01)

(52) U.S. Cl.
CPC . *A63F 2300/1075* (2013.01); *A63F 2300/303* (2013.01); *G06F 2203/04808* (2013.01)

(56) References Cited

U.S. PATENT DOCUMENTS

| | | | | | |
|---|---|---|---|---|---|
| 4,467,461 | A * | 8/1984 | Rice | G01V 1/34 | 367/110 |
| 4,845,651 | A * | 7/1989 | Aizawa | G06T 17/10 | 345/581 |
| 4,914,624 | A * | 4/1990 | Dunthorn | G06F 3/04886 | 345/173 |
| 4,920,488 | A * | 4/1990 | Filley | G06Q 10/087 | 705/28 |
| 4,984,157 | A * | 1/1991 | Cline | G06T 15/08 | 345/428 |
| 4,990,093 | A * | 2/1991 | Frazer | G09B 7/063 | 434/335 |
| 5,001,654 | A * | 3/1991 | Winiger | G06F 40/166 | 715/244 |
| 5,010,478 | A * | 4/1991 | Deran | G06F 16/2246 | |
| 5,180,946 | A * | 1/1993 | Aiga | H01J 23/54 | 315/39.53 |
| 5,235,680 | A * | 8/1993 | Bijnagte | H04L 69/329 | 725/86 |
| 5,235,702 | A * | 8/1993 | Miller | G06Q 40/02 | 707/999.102 |
| 5,243,519 | A * | 9/1993 | Andrews | G06F 40/47 | 704/8 |
| 5,247,358 | A * | 9/1993 | Richards | H04N 5/9206 | 386/E5.025 |
| 5,276,866 | A * | 1/1994 | Paolini | H04N 7/17318 | 348/E7.071 |
| 5,283,894 | A * | 2/1994 | Deran | G06F 16/40 | 707/999.001 |
| 5,289,567 | A * | 2/1994 | Roth | G06F 30/23 | 345/420 |
| 5,313,615 | A * | 5/1994 | Newman | G06F 30/20 | 716/139 |
| 5,319,747 | A * | 6/1994 | Gerrissen | G06F 3/04817 | 715/733 |
| 5,325,156 | A * | 6/1994 | Ulinski | G03G 15/5079 | 399/81 |
| 5,337,412 | A * | 8/1994 | Baker | G06F 9/451 | 713/1 |
| 5,357,599 | A * | 10/1994 | Luken | G06T 15/50 | 345/627 |
| 5,485,600 | A * | 1/1996 | Joseph | G06F 8/34 | 700/86 |
| 5,710,877 | A * | 1/1998 | Marimont | G06T 11/00 | 345/427 |
| 5,736,988 | A * | 4/1998 | Shaw | G06T 1/60 | 345/423 |
| 5,748,184 | A * | 5/1998 | Shieh | G06F 3/0488 | 345/173 |
| 5,764,222 | A * | 6/1998 | Shieh | G06F 3/0488 | 345/157 |
| 5,794,216 | A * | 8/1998 | Brown | G06Q 30/0643 | 705/27.2 |
| 5,838,917 | A * | 11/1998 | Paolini | H04N 7/17318 | 348/E7.071 |
| 5,843,732 | A * | 12/1998 | Davis | G16B 15/10 | 436/94 |
| 5,872,559 | A * | 2/1999 | Shieh | G06F 3/0488 | 345/157 |
| 5,883,628 | A * | 3/1999 | Mullaly | G06F 3/04815 | 715/850 |
| 5,894,308 | A * | 4/1999 | Isaacs | G06T 17/20 | 345/420 |
| 5,896,139 | A * | 4/1999 | Strauss | G06T 17/20 | 345/440 |
| 5,920,319 | A * | 7/1999 | Vining | G06T 17/00 | 345/419 |
| 5,973,916 | A * | 10/1999 | Han | G06F 1/1601 | 361/679.61 |
| 6,014,145 | A * | 1/2000 | Bardon | G06T 15/10 | 345/474 |
| 6,047,259 | A * | 4/2000 | Campbell | G16H 15/00 | 705/2 |
| 6,081,271 | A * | 6/2000 | Bardon | G06T 15/10 | 345/419 |
| 6,115,044 | A * | 9/2000 | Alimpich | G06F 9/4492 | 715/965 |
| 6,175,386 | B1 * | 1/2001 | Van De Schaar-Mitrea | H04N 7/088 | 375/E7.137 |
| 6,181,340 | B1 * | 1/2001 | Alimpich | G06F 3/04847 | 715/965 |
| 6,253,193 | B1 * | 6/2001 | Ginter | G06Q 10/087 | 705/52 |
| 6,292,830 | B1 * | 9/2001 | Taylor | G06N 5/043 | 709/224 |
| 6,363,488 | B1 * | 3/2002 | Ginter | H04N 21/44204 | 375/E7.009 |
| 6,389,402 | B1 * | 5/2002 | Ginter | G07F 9/026 | 705/37 |
| 6,416,960 | B1 * | 7/2002 | Bryan | G01N 33/581 | 424/138.1 |
| 6,427,140 | B1 * | 7/2002 | Ginter | H04L 9/3247 | 713/193 |
| 6,475,713 | B1 * | 11/2002 | Aylward | B32B 27/32 | 430/533 |
| 6,484,176 | B1 * | 11/2002 | Sealand | G06Q 50/16 | |
| 6,549,221 | B1 * | 4/2003 | Brown | G06F 9/451 | 715/767 |
| 6,701,064 | B1 * | 3/2004 | De Haan | G11B 27/10 | 715/788 |
| 6,812,941 | B1 * | 11/2004 | Brown | G06F 16/9577 | 715/767 |
| 6,904,588 | B2 * | 6/2005 | Reddy | G06F 8/71 | 717/104 |
| 6,910,132 | B1 * | 6/2005 | Bhattacharya | G06F 21/32 | 707/999.001 |
| 7,031,838 | B1 * | 4/2006 | Young | G06Q 50/00 | 702/5 |
| 7,084,859 | B1 * | 8/2006 | Pryor | G01C 21/3664 | 345/173 |
| 7,148,875 | B2 * | 12/2006 | Rosenberg | G06F 1/1626 | 345/157 |
| 7,307,622 | B2 * | 12/2007 | Uchiyama | G06F 3/045 | 345/157 |
| 7,307,623 | B2 * | 12/2007 | Enomoto | G06F 3/04817 | 345/173 |
| 9,787,890 | B2 * | 10/2017 | Cho | H04N 23/62 | |
| 9,952,755 | B2 * | 4/2018 | Ogiso | G06F 3/04845 | |
| 2002/0078459 | A1 * | 6/2002 | McKay | G09F 27/00 | 348/E7.087 |
| 2004/0196234 | A1 * | 10/2004 | Shiomi | G09G 3/3648 | 345/89 |
| 2005/0055249 | A1 * | 3/2005 | Helitzer | G06Q 40/08 | 705/4 |
| 2005/0250561 | A1 * | 11/2005 | Lee | H04M 1/0247 | 455/575.3 |
| 2005/0268319 | A1 * | 12/2005 | Brady, Jr. | B60N 2/797 | 725/77 |
| 2006/0001650 | A1 * | 1/2006 | Robbins | G06F 3/0482 | 345/173 |

(56) References Cited

U.S. PATENT DOCUMENTS

| | | | | |
|---|---|---|---|---|
| 2007/0021987 A1* | 1/2007 | Binns | ................... | G06Q 10/10 705/2 |
| 2007/0252795 A1* | 11/2007 | Shiomi | ................ | G09G 3/3648 345/87 |
| 2008/0147448 A1* | 6/2008 | McLaughlin | .......... | G06Q 40/08 705/4 |
| 2008/0167095 A1* | 7/2008 | Kim | .................... | H04M 1/0268 455/575.3 |
| 2008/0189630 A1* | 8/2008 | Kondo | .................. | G06F 3/0346 715/762 |
| 2014/0101576 A1* | 4/2014 | Kwak | ................... | G06F 1/1618 715/761 |
| 2014/0101579 A1* | 4/2014 | Kim | ................... | G06F 3/04845 715/761 |
| 2014/0152576 A1* | 6/2014 | Kim | ...................... | G06F 3/0412 345/169 |
| 2014/0247246 A1* | 9/2014 | Maus | ................... | G06F 3/0393 345/174 |
| 2015/0103018 A1* | 4/2015 | Kamin-Lyndgaard | ...................... | G06F 3/0443 345/173 |
| 2015/0277580 A1* | 10/2015 | Kumar | ................. | G06F 1/1626 345/172 |
| 2016/0026381 A1* | 1/2016 | Kim | .................... | G06F 3/04817 715/761 |
| 2017/0182409 A1 | 6/2017 | Townley et al. | | |
| 2017/0313248 A1* | 11/2017 | Kothari | ................... | B60R 1/008 |
| 2017/0315626 A1 | 11/2017 | Townley et al. | | |
| 2018/0157395 A1* | 6/2018 | Mhun | ................. | G06F 3/04883 |
| 2018/0234639 A1* | 8/2018 | Kim | ................... | H04M 1/72409 |
| 2020/0089460 A1* | 3/2020 | Sirpal | ...................... | H05K 5/04 |
| 2020/0133426 A1* | 4/2020 | Yildiz | ................... | G06F 1/1616 |
| 2021/0112196 A1* | 4/2021 | Iyer | ...................... | H04N 23/611 |

FOREIGN PATENT DOCUMENTS

| | | |
|---|---|---|
| CN | 108958615 A | 12/2018 |
| CN | 109045689 A | 12/2018 |
| CN | 109157832 A | 1/2019 |
| CN | 110215689 A | 9/2019 |
| CN | 111228793 A | 6/2020 |
| EP | 2 479 636 A2 | 7/2012 |
| EP | 2 595 035 A1 | 5/2013 |
| WO | 2015/089451 A1 | 6/2015 |

OTHER PUBLICATIONS

CN Office Action for corresponding CN 202010072577.9, dated May 10, 2021.
Written Opinion for PCT/CN2020/129134, dated Feb. 5, 2021.
International Search Report for PCT/CN2020/129134, dated Feb. 5, 2021.
Extended European Search Report dated Oct. 10, 2022 in European Application No. 20915725.4.
Translation of Written Opinion for PCT/CN2020/129134, dated Feb. 5, 2021.

* cited by examiner

METHOD AND APPARATUS FOR DISPLAYING INTERACTION INTERFACE, STORAGE MEDIUM, AND ELECTRONIC DEVICE

CROSS REFERENCE TO RELATED APPLICATION(S)

This application is a continuation application of International Application No. PCT/CN2020/129134, filed Nov. 16, 2020, which claims priority to Chinese Patent Application No. 202010072577.9 filed with the China National Intellectual Property Administration on Jan. 21, 2020, the disclosures of which are incorporated by reference in their entireties.

FIELD

Embodiments of the disclosure relate to the field of games, and specifically, to a method and apparatus for displaying an interaction interface, a storage medium, and an electronic device.

BACKGROUND

With the development and popularization of mobile terminals, more people choose to entertain themselves using mobile terminals, that is, playing games on mobile terminals. In related art, players need to hold their mobile terminals with two hands to interact with a virtual game or scene displayed on their mobile terminal. More specifically, there are two touch regions on the mobile terminal, and the player usually operates in the touch regions with two thumbs to control a virtual operation object in the game to perform specified operations.

Generally, inputting two simultaneous touch operations into the game reduces player control over the virtual operation object to perform specified operations. For example, while controlling the virtual operation object to perform a shooting operation, the player can usually only move the virtual operation object but cannot perform an aiming operation. In other words, a plurality of valid touch operations simultaneously inputted into the game, i.e., a virtual interaction scene, may not be all implemented, affecting player experience of simultaneously performing a plurality of specified operations by the virtual operation object in the virtual interaction scene.

SUMMARY

Embodiments of this application provide a method and apparatus for displaying an interaction interface, a storage medium, and an electronic device, to enable a virtual operation object to simultaneously complete a plurality of specific operations.

The embodiments of the present disclosure provide a method for displaying an interaction interface, performed by an electronic device, the method including:

displaying a first interaction interface of a target game application in a front display region of a display screen of a mobile terminal, the display screen including the front display region and a back display region respectively located on different sides of the mobile terminal;

detecting a first interaction operation in the back display region, the first interaction operation being used for switching from displaying the first interaction interface in the front display region to displaying a second interaction interface of the target game application; and in response to the first interaction operation, switching from displaying the first interaction interface in the front display region to displaying the second interaction interface, the second interaction interface including an interactive object different from an interactive object in the first interaction interface.

The embodiments of the present disclosure provide an apparatus for displaying an interaction interface, the apparatus including at least one memory configured to store program code; and at least one processor configured to read the program code and operate as instructed by the program code, the program code comprising:

display code configured to cause the at least one processor to display a first interaction interface of a target game application in a front display region of a display screen of a mobile terminal, the display screen including the front display region and a back display region respectively located on different sides of the mobile terminal;

first detection code configured to cause the at least one processor to detect a first interaction operation in the back display region, the first interaction operation being used for switching from displaying the first interaction interface in the front display region to displaying a second interaction interface of the target game application; and first switching code configured to cause the at least one processor to switch from displaying the first interaction interface in the front display region to displaying the second interaction interface in response to the first interaction operation, the second interaction interface including an interactive object different from an interactive object in the first interaction interface.

The embodiments of the present disclosure provide a non-transitory computer-readable storage medium, storing a computer program, the computer program being executable by at least one processor to perform the method for displaying an interaction interface according to embodiments of the present disclosure.

The embodiments of the present disclosure provide an electronic device, including a memory, a processor, and a computer program that is stored in the memory and executable on the processor, the processor performing the method for displaying an interaction interface by using the computer program according to embodiments of the present disclosure.

In the embodiments of the present disclosure, a first interaction interface of a target game application is displayed in a front display region of a display screen of a mobile terminal, the display screen including the front display region and a back display region respectively located on different sides of the mobile terminal; a first interaction operation is detected in the back display region, the first interaction operation being used for switching from displaying the first interaction interface in the front display region to displaying a second interaction interface of the target game application; and in response to the first interaction operation, the first interaction interface in the front display region is switched to the second interaction interface, the second interaction interface including an interactive object different from an interactive object in the first interaction interface, so that a plurality of interactive objects may be displayed in display regions located on different sides of the mobile terminal, and a player may simultaneously touch the plurality of interactive objects to control a virtual operation object to simultaneously complete a plurality of specified operations. Achieving a technical effect of simultaneously completing the plurality of specified operations by the virtual operation object. Therefore, the current technical problem that a plurality of operations cannot be simultaneously performed on the virtual operation object is resolved, and the mobile terminal is helped to simultaneously perform parallel processing on the plurality of specified operations, computing resources of the mobile terminal are fully used, thereby improving processing efficiency of performing the plurality of specified operations.

BRIEF DESCRIPTION OF THE DRAWINGS

The accompanying drawings described herein are used for providing further understanding of the present disclosure, and constitute a part of the present disclosure. Exemplary embodiments of the present disclosure and descriptions thereof are used for explaining the present disclosure, but do not constitute any inappropriate limitation to the present disclosure. In the accompanying drawings.

DETAILED DESCRIPTION

In order to make a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are merely some rather than all of the embodiments. All other embodiments obtained by a person of ordinary skill in the art based on the embodiments of the present disclosure without creative efforts shall fall within the protection scope of the present disclosure.

In this specification, the claims, and the accompanying drawings of the present disclosure, the terms such as "first" and "second" are intended to distinguish similar objects, but are not necessarily intended to describe a specific order or sequence. The data termed in such a way are interchangeable in appropriate circumstances, so that the embodiments of the present disclosure described herein can be implemented in orders other than the order illustrated or described herein. Moreover, the terms "include" and "contain" and any other variants thereof are intended to cover the non-exclusive inclusion. For example, a process, method, system, product, or device that includes a list of steps, operations, or units is not necessarily limited to those expressly listed steps, operations, or units, but may include other steps, operations, or units not expressly listed or inherent to such a process, method, system, product, or device.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Nouns and terms involved in the embodiments of the present disclosure are described before the embodiments of the present disclosure are further described in detail. The nouns and terms provided in the embodiments of the present disclosure are applicable to the following explanations.

Taptic feedback is implemented by using a taptic engine. Several taptic engines are added inside the device to achieve more complex taptic, thereby implementing better man-machine interaction. The taptic feedback has a "directional precision", which indicates that the user may receive tactile feedback no matter where a user taps any region of a screen.

Figure 1:
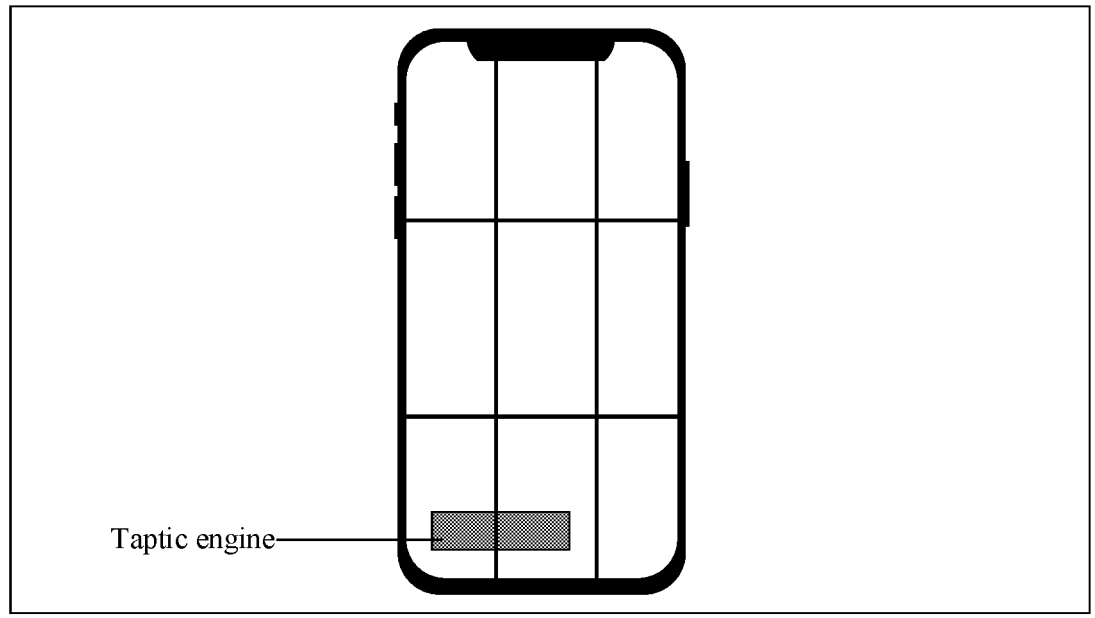
FIG. 1 is a schematic diagram of an example taptic feedback mechanism.

For example, FIG. 1 is a schematic diagram of an example taptic feedback mechanism according to an embodiment of the present disclosure. A display interface of a terminal shown in FIG. 1 is divisional triggered within a 3×3 grid, so that the terminal may support to receive taptic feedback from 9 different positions. The taptic engines set in the terminal will start when the user taps/clicks any grid, so that the user may feel "taptic".

A folded screen is a flexible screen. The folded screen may be bent or even twisted 360 degrees. Currently, the folded screen can be applied to the mobile terminal.

Figure 2:
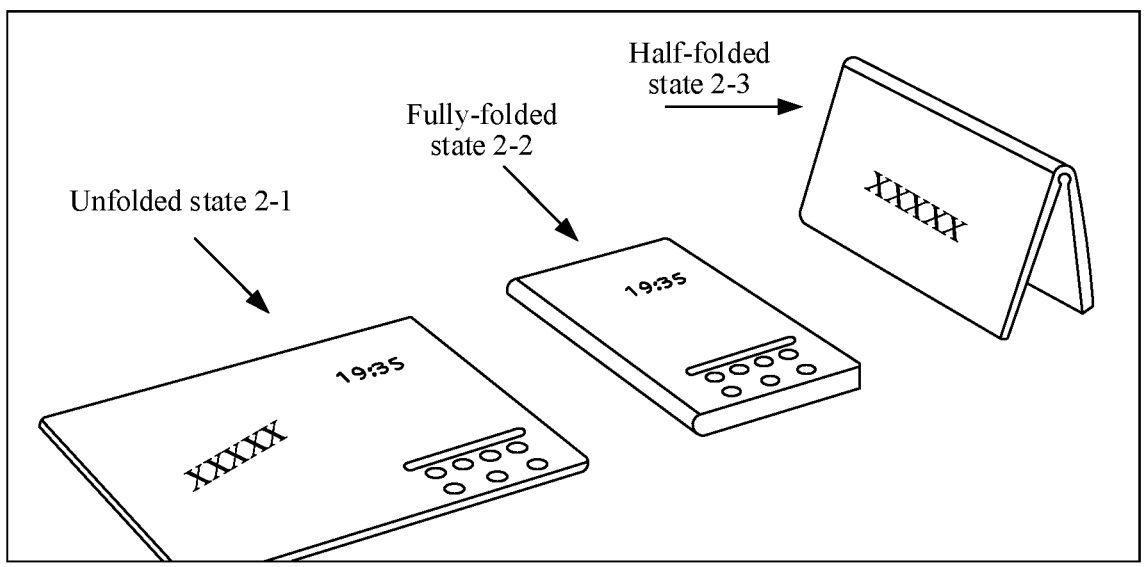
FIG. 2 is a schematic diagram of an example folded screen on a mobile terminal.

For example, FIG. 2 shows a schematic diagram of a folded screen according to an embodiment of the present disclosure. The folded screen is disposed on the terminal, and the display interface can be normally displayed when the terminal is in an unfolded state 2-1, a fully-folded state 2-2, and a half-folded state 2-3.

With the popularization of mobile terminals, mobile terminals have also become new game carriers. During interaction between the player and a virtual scene (such as a game scene) displayed on the mobile terminal, the player usually needs to hold the mobile terminal with two hands, and perform touch operations in two touch regions with two thumbs, to control a virtual operation object in the virtual scene to perform specified actions. For example, in a shooting game, the player usually needs to simultaneously control the movement of a game character and aiming of a shooting target, and also readily perform a shooting operation. However, experience of simultaneously moving, aiming, and shooting cannot be implemented like a handle due to a limitation to a quantity of touch inputs on the mobile terminal.

Figure 3:
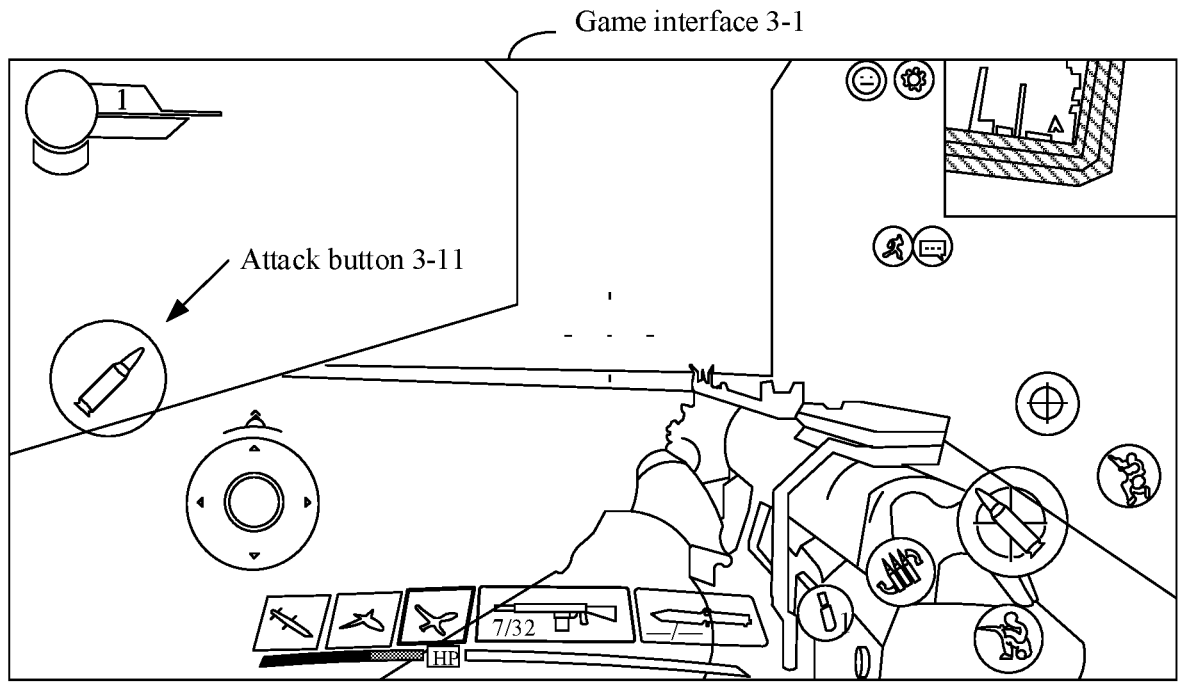
FIG. 3 is a schematic diagram of an example game interaction in a shooting game in the related art.
Figure 4:
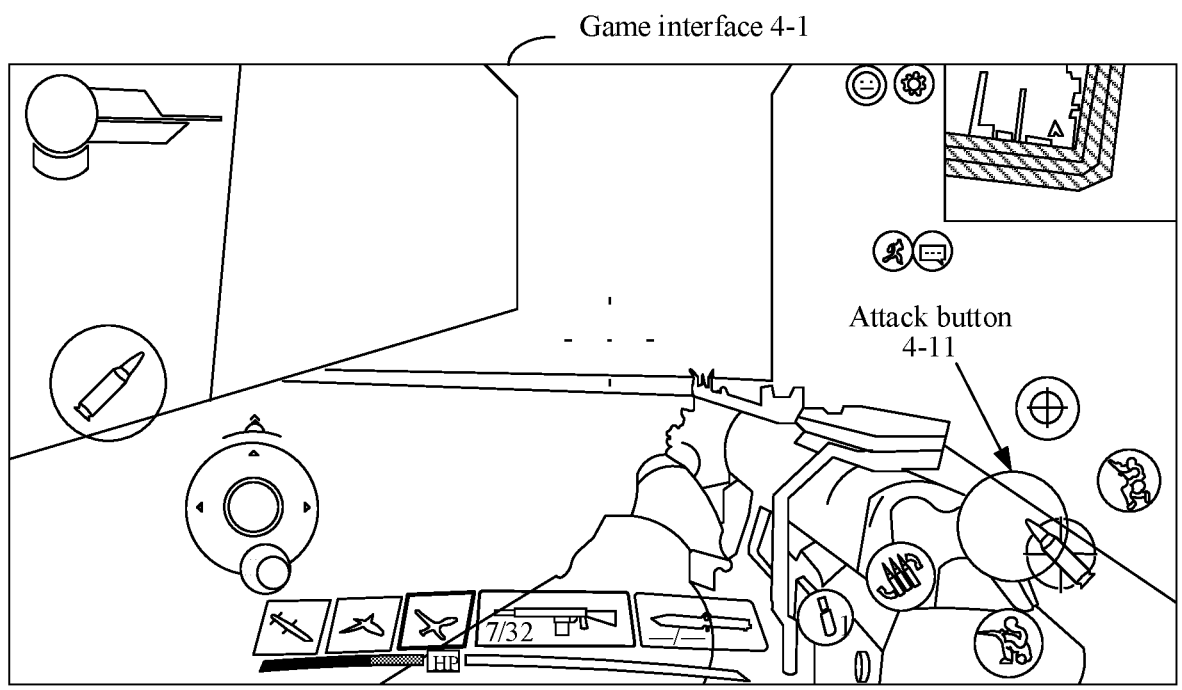
FIG. 4 is a schematic diagram of an example game interaction in a shooting game in the related art.

For example, FIG. 3 is a first schematic diagram of game interaction in a shooting game in the related art. Referring to FIG. 3, in a game interface 3-1, the player needs to tap an attack button 3-11 on a left side, to implement a simultaneous interaction of any two of the moving, aiming, and shooting. However, in this case, the player can only use one weapon, and the player needs to manually tap at the bottom to switch between different weapons. FIG. 4 is a second schematic diagram of game interaction in a shooting game in the related art. Referring to FIG. 4, a right joystick mechanism is added to an attack button 4-11 on a right side of a game interface 4-1, to implement an aiming operation during attacking.

In view of this, the player cannot implement the experience of simultaneously moving, aiming, and shooting like a handle due to the limitation to the quantity of inputted touch operations during performing a game interaction operation on the mobile terminal. To be specific, in the related art, when a plurality of valid touch operations simultaneously inputted into a virtual interaction scene, only some of the inputs may be processed or implemented, affecting players' experience of simultaneously performing a plurality of specified operations by the virtual operation object in the virtual interaction scene. In addition, the virtual operation object can only use one weapon, and switching between different weapons needs to be manually performed at the bottom of the virtual interaction scene, affecting experience of switching weapons by the virtual operation object.

Based on the above, a person skilled in the art may not have analyzed display of an interaction interface in a virtual scene, and the foregoing technical problems may not be common knowledge for a person skilled in the art. Therefore, it is difficult for a person skilled in the art to find the foregoing problems and create solutions. In the embodiments of the present disclosure, the display of the interaction interface in the virtual scene is analyzed, and the foregoing technical solutions are found.

Embodiments of the present disclosure provide a method and apparatus for displaying an interaction interface, a storage medium, and an electronic device, to enable a virtual operation object to simultaneously complete a plurality of specific operations. The method for displaying an interaction interface provided in the present disclosure is performed by the electronic device. In some embodiments of the present disclosure, the electronic device may be separately implemented. For example, some steps or operations are performed in a terminal device, while other steps or operations are performed in a server, and the display of the interaction interface is implemented through interaction between the server and the terminal device. In some other embodiments of the present disclosure, the electronic device may be implemented as a whole. For example, all implementation steps or operations may be performed in the terminal device, to implement the display of the interaction interface.

Figure 5:
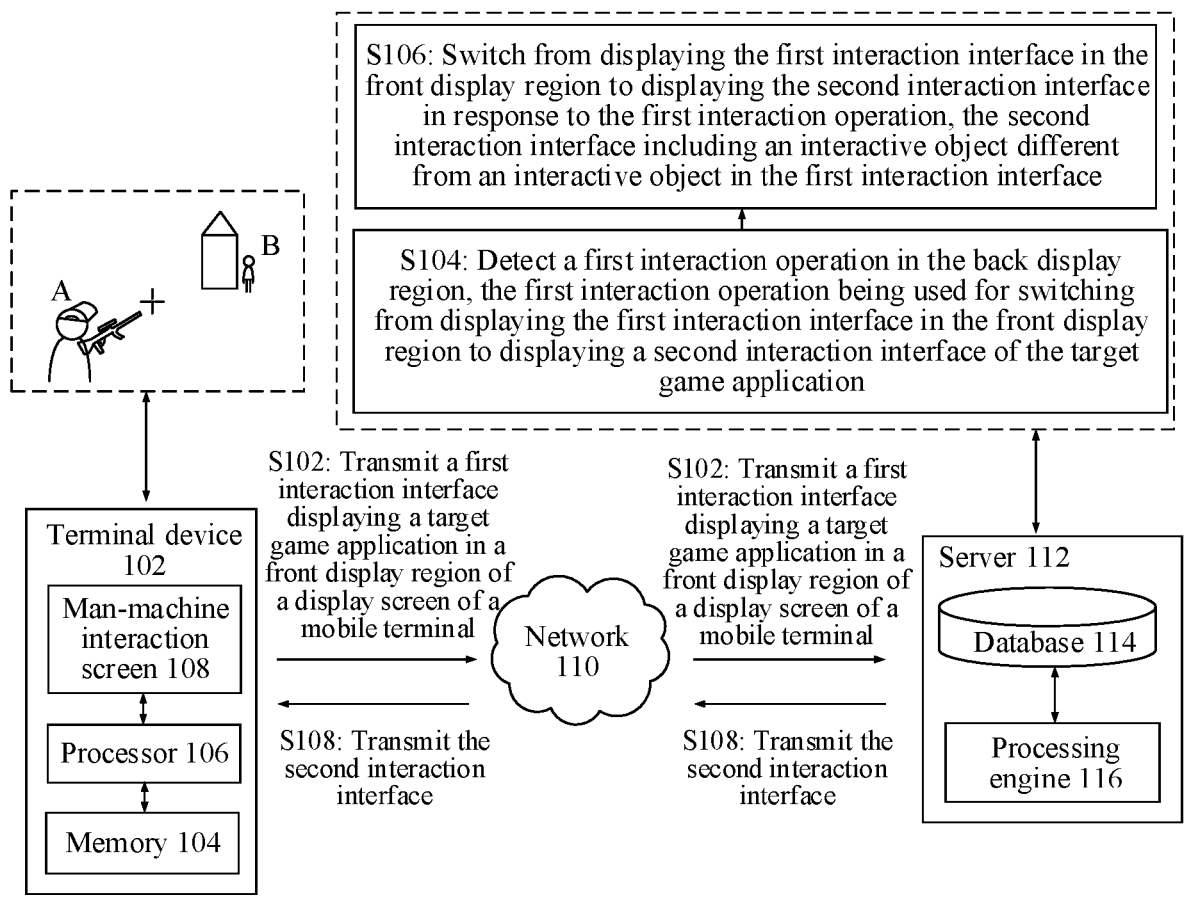
FIG. 5 is an schematic diagram of a display system of an interaction interface according to an embodiment of the present disclosure.

In some embodiments of the present disclosure, the foregoing method for displaying an interaction interface may be applied to, but is not limited to, a display system of an interaction interface in a hardware environment shown in FIG. 5. The display system of an interaction interface may include, but is not limited to: a terminal device 102, a network 110, and a server 112. A game client is run in the terminal device 102, and is configured to control a target virtual operation object to complete a game task in the game scene.

The terminal device 102 may include, but is not limited to: a memory 104, a processor 106, and a man-machine interaction screen 108. The man-machine interaction screen 108 is configured to acquire man-machine interaction instructions through a man-machine interaction interface, and is further configured to present an interactive object of the virtual operation object controlled by the player in the game. The processor 106 is configured to control the target virtual operation object to perform the specified operation in response to the foregoing man-machine interaction instructions, to complete the game task. The memory 104 is configured to store attribute information of the target virtual operation object. The server herein may include, but is not limited to: a database 114 and a processing engine 116. The processing engine 116 is configured to: call a first interaction interface displaying a target game application in a front display region of a display screen of the mobile terminal from the database 114, the display screen including the front display region and a back display region respectively located on different sides of the mobile terminal (e.g., terminal device 102); detect a first interaction operation in the back display region, the first interaction operation being used for switching from the first interaction interface in the front display region to displaying a second interaction interface of the target game application; and switch from displaying the first interaction interface in the front display region to displaying the second interaction interface in response to the first interaction operation, the second interaction interface including an interactive object different from an interactive object in the first interaction interface. Thus, a plurality of interactive objects may be displayed in display regions located on different sides of the mobile terminal, and the player may simultaneously touch the plurality of interactive objects to control the virtual operation object to simultaneously complete a plurality of specified operations. This allows the player to simultaneously complete the plurality of specified operations by the virtual operation object, and achieving a technical solution to a technical problem in the related art, the technical problem being that a plurality of operations cannot be simultaneously performed on the virtual operation object.

Specific steps or operations may be as follows: displaying an interaction interface (for example, a shooting game shown in FIG. 5, in which a target virtual character A is sniping a target object B at a long distance) of running a round of target game application by the game client in the man-machine interaction screen 108 of the terminal device 102. In operations S102 to S108: a first interaction interface displaying a target game application in a front display region of a display screen of a mobile terminal is acquired, the display screen including the front display region and a back display region respectively located on different sides of the mobile terminal, and the first interaction interface is transmitted to the server 112 by using the network 110; a first interaction operation in the back display region is detected by the server 112, the first interaction operation being used for switching from displaying the first interaction interface in the front display region to displaying a second interaction interface of the target game application; the first interaction interface in the front display region is switched to the second interaction interface in response to the first interaction operation, the second interaction interface including an interactive object different from an interactive object in the first interaction interface; and then the foregoing determined results are transmitted to the terminal device 102.

In some embodiments, operations S102 to S108 may include the following: the terminal device 102 displays a first interaction interface of a target game application in a front display region of a display screen of a mobile terminal, the display screen including the front display region and a back display region respectively located on different sides of the mobile terminal; detects a first interaction operation in the back display region, the first interaction operation being used for switching from displaying the first interaction interface in the front display region to displaying a second interaction interface of the target game application; and switches from displaying the first interaction interface in the front display region to displaying the second interaction interface in response to the first interaction operation, the second interaction interface including an interactive object different from an interactive object in the first interaction interface. Thus, a plurality of interactive objects may be displayed in display regions located on different sides of the mobile terminal, and the player may simultaneously touch the plurality of interactive objects to control the virtual operation object to simultaneously complete a plurality of specified operations. Therefore, a player may simultaneously complete the plurality of specified operations by the virtual operation object, resolving the technical problem in the related art that a plurality of operations cannot be simultaneously performed on the virtual operation object. Essentially, a technical solution to the technical problem of simultaneously inputting a plurality of effective touch operations into a virtual interaction scene and processing them may be implemented, positively affecting players' experience of simultaneously performing a plurality of specified operations by the virtual operation object in the virtual interaction scene.

In some embodiments of the present disclosure, the foregoing method for displaying an interaction interface may be applied to, but is not limited to, the server 112 configured to assist an application client to display the second interaction interface. The server 112 may be an independent physical server, a server cluster composed of a plurality of physical servers, or a distributed system, or may further be a cloud server providing cloud computing services. The foregoing application client may be run in, but is not limited to, the terminal device 102. The terminal device 102 may be, but is not limited to, a mobile phone, a tablet computer, a notebook computer, a PC, and other terminal devices that support running the application client. The foregoing server 112 and the terminal device 102 may perform, but not limited to, data exchange with each other by using a network. The network may include, but is not limited to, a wireless network or a wired network. The wireless network includes: Bluetooth, Wi-Fi, and other networks implementing wireless communication. The foregoing wired network may include, but is not limited to, a wide area network, a metropolitan area network, and a local area network. The foregoing description is merely an example, and this is not limited in this embodiment.

Figure 6:
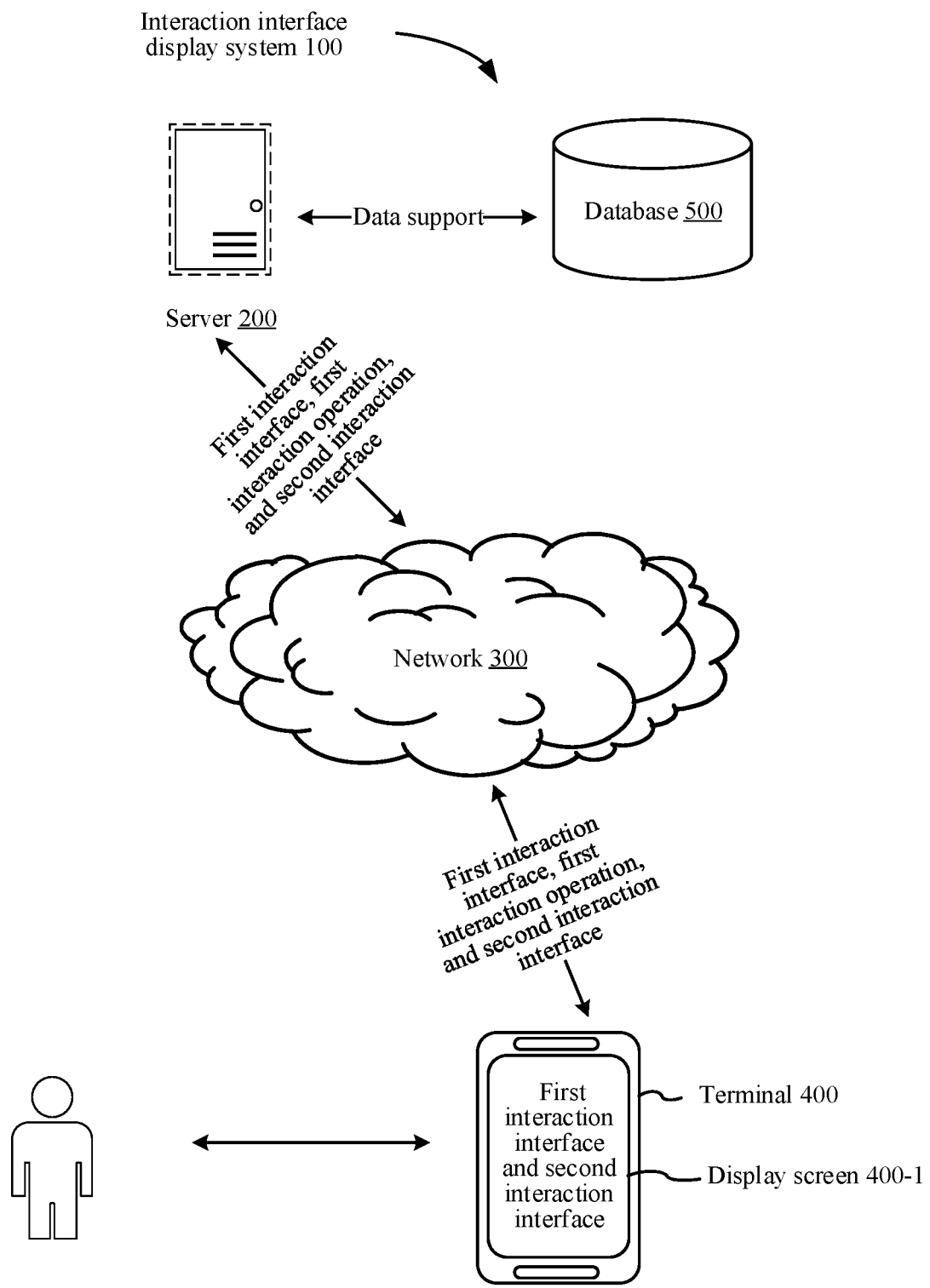
FIG. 6 is a schematic diagram of an example application scene of a display system of an interaction interface according to an embodiment of the present disclosure.

For example, referring to FIG. 6, FIG. 6 is a schematic diagram of an application scene of a display system 100 of an interaction interface according to an embodiment of the present disclosure. A terminal device 400 is connected to a server 200 by using a network 300. The network 300 may be a wide area network, a local area network, or a combination of the wide area network and the local area network. The server 200 is further equipped with a database 500. The database 500 is configured to provide data support for the server 200.

The terminal device 400 transmits, to the server 200, a first interaction interface displaying a target game application in a front display region of a display screen 400-1, and a first interaction operation detected in a back display region. The display screen includes the front display region and the back display region respectively located on different sides of a mobile terminal, and the first interaction operation is used for switching from displaying the first interaction interface in the front display region to displaying a second interaction interface of the target game application.

The server 200 switches from displaying the first interaction interface in the front display region to displaying the second interaction interface in response to the first interaction operation, the second interaction interface including an interactive object different from an interactive object in the first interaction interface, and transmits the second interaction interface to the terminal device 400.

The terminal device 400 displays the second interaction interface in the front display region of the display screen 400-1.

Figure 7:
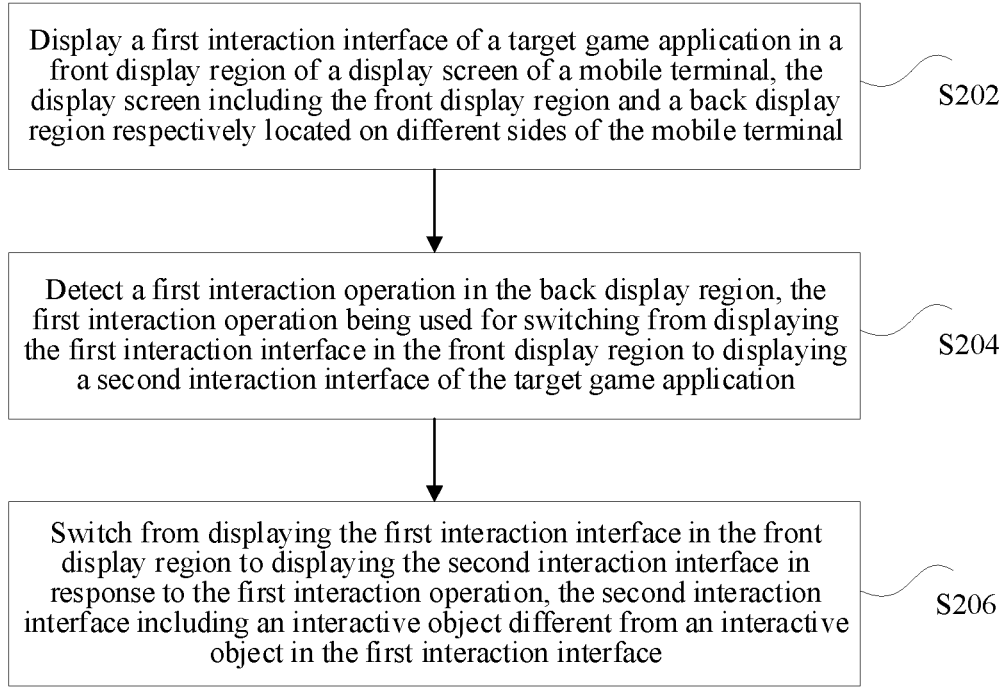
FIG. 7 is a flowchart of a method for displaying an interaction interface according to an embodiment of the present disclosure.

In some embodiments of the present disclosure, as shown in FIG. 7, the method for displaying an interaction interface provided in the present disclosure includes:

Operation S202: Display a first interaction interface of a target game application in a front display region of a display screen of a mobile terminal, the display screen including the front display region and a back display region respectively located on different sides of the mobile terminal.

Operation S204: Detect a first interaction operation in the back display region, the first interaction operation being used for switching from displaying the first interaction interface in the front display region to displaying a second interaction interface of the target game application.

Operation S206: Switch from displaying the first interaction interface in the front display region to displaying the second interaction interface in response to the first interaction operation, the second interaction interface including an interactive object different from an interactive object in the first interaction interface.

In the embodiments of the present disclosure, the display screen of the mobile terminal includes, but is not limited to, a folded screen, a dual screen, a surrounding screen, and the like. The display screen of the mobile terminal may be folded, so that the display screen of the mobile terminal includes at least two display regions.

It is to be understood that, the front display region may be any one of the at least two display regions, and the back display region is a display region except the front display region in the at least two display regions.

In the embodiments of the present disclosure, the detecting a first interaction operation in the back display region includes: simultaneously detecting a touch operation in different subregions of the back display region, the first interaction operation including the touch operation.

Figure 8:
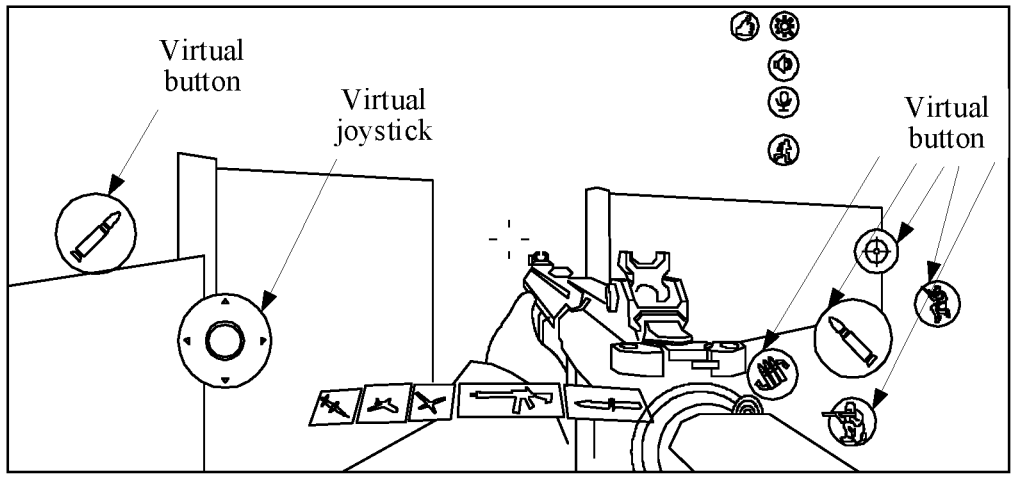
FIG. 8 is a schematic diagram of an example interaction interface of a target game application displayed in a mobile terminal in a normal state according to an embodiment of the present disclosure.

FIG. 8 shows an interaction interface of a target game application displayed in a mobile terminal in a normal state according to an embodiment according to the present disclosure. As shown in FIG. 8, a virtual joystick and a virtual button are displayed on a left side of the interaction interface. The player may tap the virtual button to perform a shooting operation, and move the virtual joystick to perform movement. In addition, five virtual buttons are further displayed on a right side of the interaction interface, and the player may perform operations such as crawling, aiming, squatting, bullet loading, and jumping by using the five virtual buttons.

In some embodiments of the present disclosure, the simultaneously detecting a touch operation in different subregions of the back display region includes:

simultaneously detecting a touch and hold operation in a first subregion and a second subregion of the back display region, the touch operation including the touch and hold operation; or simultaneously detecting a double-tap operation in a first subregion and a second subregion of the back display region, the touch operation including the double-tap operation; or simultaneously detecting a single-tap operation in a first subregion and a second subregion of the back display region, the touch operation including the single-tap operation.

In other words, in the embodiments of the present disclosure, the detected operation may be used as the touch operation by the electronic device when any one or more of a touch and hold operation, a double-tap operation, and a single-tap operation are detected in the first subregion and the second subregion of the back display region. That is, the touch operation includes one or more of the touch and hold operation, the double-tap operation, and the single-tap operation.

The first subregion and the second subregion are respectively located in a left side region and a right side region of the back display region when the back display region is displayed in a landscape mode, the first subregion and the second subregion being non-overlapping in the back display region. That is, the electronic device divides the back display region into a left portion and a right portion according to the first subregion and the second subregion.

According to the solutions provided in the embodiments of the present disclosure, the electronic device detects a first interaction operation in a back display region, and switches from displaying a first interaction interface in a front display region to displaying a second interaction interface in response to the first interaction operation, the second interaction interface including an interactive object different from an interactive object in the first interaction interface.

Figure 9:
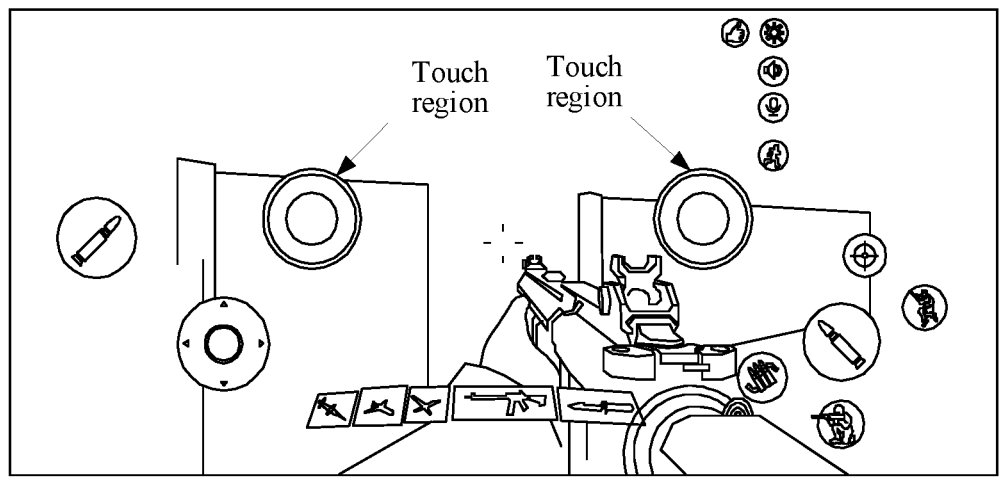
FIG. 9 is a schematic diagram of an example interface showing two touch regions according to an embodiment of the present disclosure.
Figure 10:
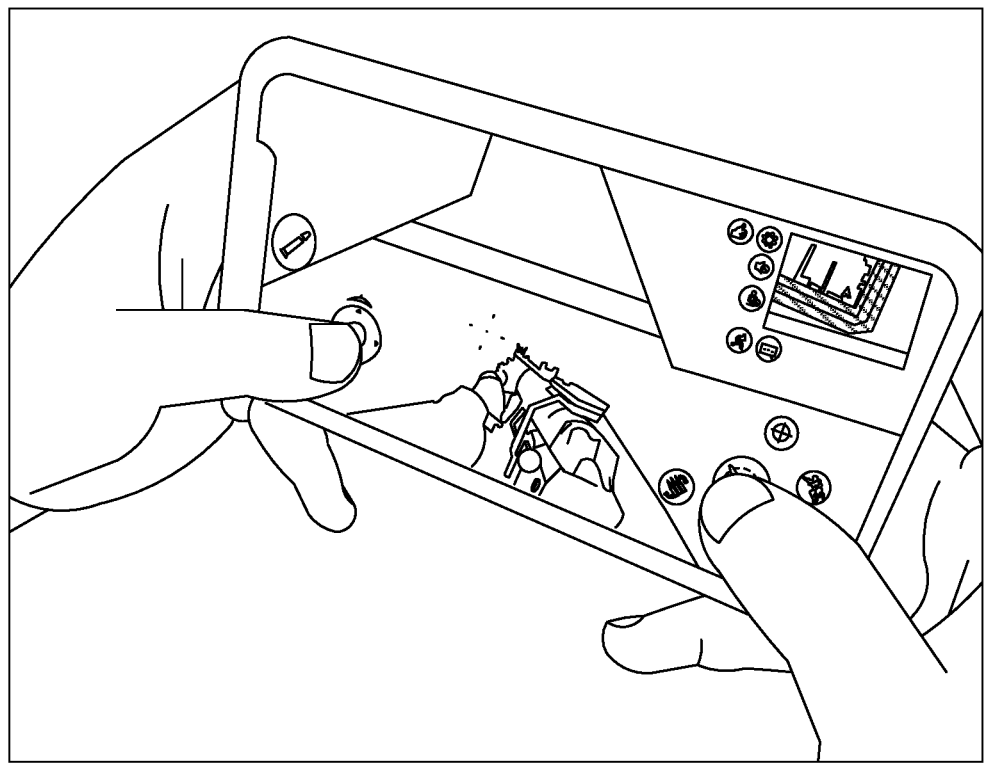
FIG. 10 is a schematic diagram of an example phone holding gesture for triggering a two-hand operation according to an embodiment of the present disclosure.
Figure 11:
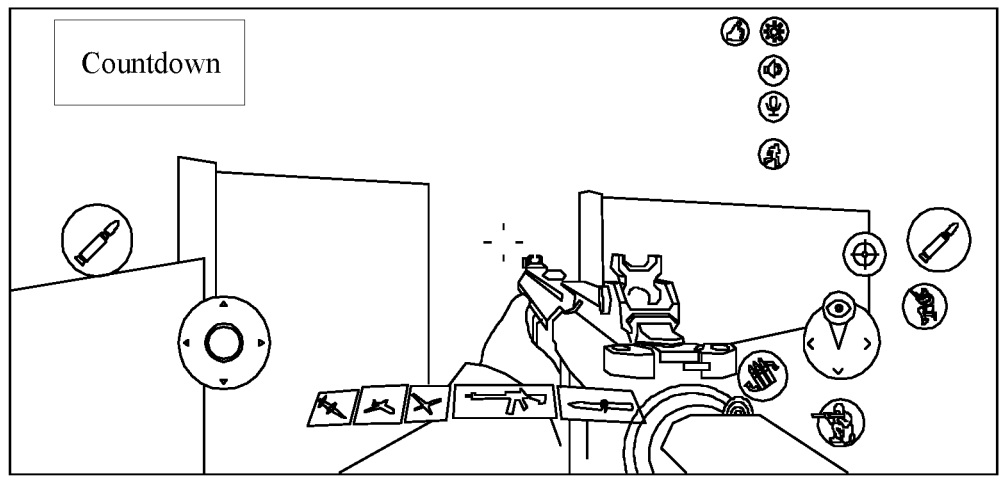
FIG. 11 is a flowchart of an exemplary method for displaying an interaction interface according to an embodiment of the present disclosure.
Figure 12:
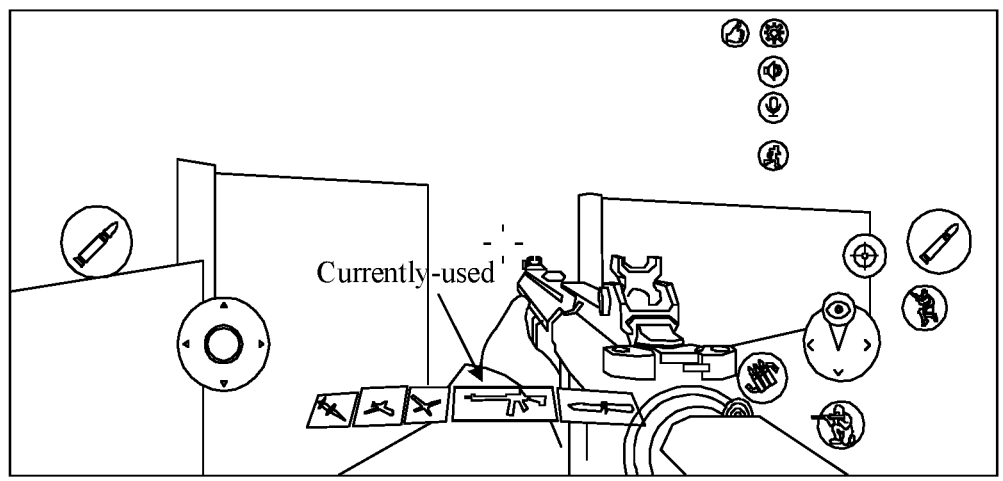
FIG. 12 is an exemplary interface of a two-hand operation mode according to an embodiment of the present disclosure.

For example, the player may trigger a two-hand operation mode (in which the back display region is displayed) after touching and holding a region of a front display screen of a folded screen shown in FIG. 8 with left and right hands for a specific time, and a countdown indicating that the two-hand operation is to be triggered may be displayed. FIG. 9 shows a schematic diagram of an interface in which an electronic device displays two touch regions according to an embodiment according to the present disclosure. As shown in FIG. 9, the player displays two touch regions. The player may trigger the countdown indicating that the two-hand operation mode is to be triggered after simultaneously tapping, for a preset time, the two touch regions with two hands in a phone holding gesture for triggering the two-hand operation as shown in FIG. 10. After the player triggers the two-hand operation, two progress countdowns appear in the interface. The two-hand operation mode is triggered and an interface layout may be adjusted after a progress bar is completed. An example interaction interface provided in FIG. 11 may further display a countdown prompt, and the two-hand operation mode is displayed after the countdown ends. A layout diagram in which a layout of a target game interface changed after the countdown ends, as shown in FIG. 12, is a first interface of a two-hand operation mode. The interface is located on a left side region of the back display region.

Figure 13:
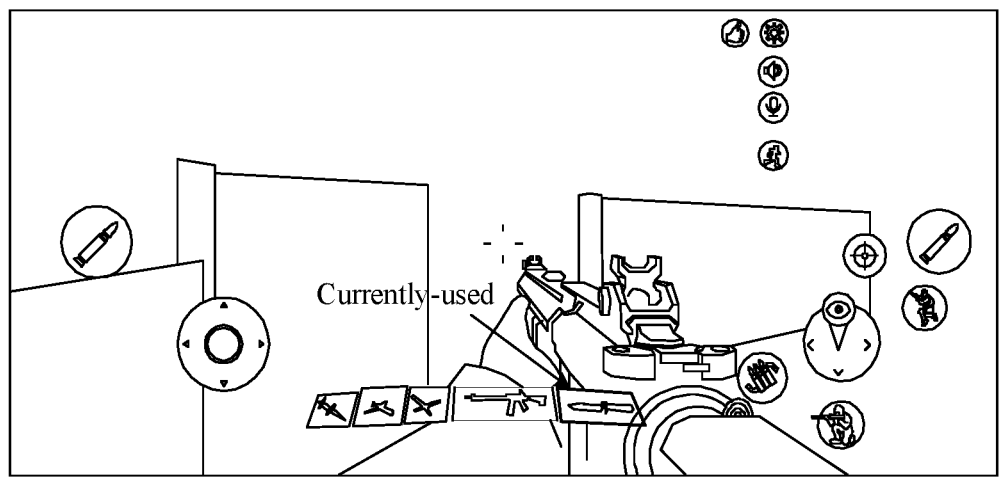
FIG. 13 is an exemplary interface of a two-hand operation mode according to an embodiment of the present disclosure.

In the interface shown in FIG. 12, the player taps a shooting key on a left side of a back surface of the folded screen with the left hand, to perform a shooting operation in the game. The electronic device will display a tap feedback in response to the shooting operation. In the interface shown in FIG. 12, a gun currently used by the player is a gun on the left side. FIG. 13 shows a second interface of a two-hand operation mode. The interface is located on a right side region of the back display region. In the interface shown in FIG. 13, the player taps a shooting key (a touch key marked by a bullet) on a right side with the right hand, and the electronic device will display a tap feedback in response to the shooting operation. In the interface shown in FIG. 13, a gun currently used by the player is a weapon on the right side. In the two-hand operation mode, an interaction manner is changed to that the left hand controls the movement of the virtual operation object by using a joystick, and the right hand controls a visual field range of the virtual operation object on a front surface of the folded screen.

In an embodiment according to the present disclosure, the electronic device may divide the display screen displayed in a landscape state into a left side region and a right side by using a virtual center line, and the first subregion and the second subregion are respectively displayed in the left side region and the right side region. In other words, the display screen is divided into two subregions when the mobile terminal is in the landscape state. The electronic device may divide the mobile terminal in the landscape state into two equal display regions by using the virtual center line, or divide the mobile terminal in the landscape state into two unequal display regions by using a division line, or divide the mobile terminal in the landscape state into three display regions by using two division lines, the display region in the middle having no touch region. That is, the electronic device may perform region division on the display screen in a manner of equal division, unequal division, or even multiple division.

In some embodiments of the present disclosure, switching from displaying the first interaction interface in the front display region to displaying the second interaction interface includes:

respectively displaying a first virtual joystick and a second virtual joystick in a left side subregion and a right side subregion of the front display region or respectively displaying the first virtual joystick and the second virtual joystick in the right side subregion and the left side subregion of the front display region when the front display region is displayed in the landscape mode, the left side subregion and the right side subregion of the front display region being non-overlapping, the first virtual joystick being configured for moving a virtual operation object in the target game application, the second virtual joystick being configured for moving a crosshair of a virtual attack prop used by the virtual operation object, and the second virtual joystick being different from the interactive object in the first interaction interface.

In some embodiments of the present disclosure, setting a target region of the back display region as a touch detection region in response to the first interaction operation, the target region being configured for detecting a target touch operation, and the target touch operation being used for controlling a virtual operation object in the target game application to perform a target attack operation by using a virtual attack prop.

The setting a target region of the back display region as a touch detection region includes:
  setting a third subregion of the back display region as the touch detection region, the target region including the third subregion; or
  setting a third subregion and a fourth subregion of the back display region as the touch detection regions, the target region including the third subregion and the fourth subregion, the third subregion and the fourth subregion being respectively located in the left side region and the right side region of the back display region in a case that the back display region is displayed in the landscape mode, and the third subregion and the fourth subregion being non-overlapping in the back display region.

In some embodiments of the present disclosure, switching from displaying the first interaction interface in the front display region to displaying the second interaction interface in response to the first interaction operation includes:
  displaying a second countdown in the front display region in response to the first interaction operation; and
  displaying the second interaction interface in the front display region after the second countdown ends.

In the embodiments provided in the present disclosure, a first interaction interface of a target game application is displayed in a front display region of a display screen of a mobile terminal, the display screen including the front display region and a back display region respectively located on different sides of the mobile terminal; a first interaction operation is detected in the back display region, the first interaction operation being used for switching from displaying the first interaction interface in the front display region to displaying a second interaction interface of the target game application; and the first interaction interface in the front display region is switched to the second interaction interface in response to the first interaction operation, the second interaction interface including an interactive object different from an interactive object in the first interaction interface, so that a plurality of interactive objects may be displayed in display regions located on different sides of the mobile terminal, and a player may simultaneously touch the plurality of interactive objects to control a virtual operation object to simultaneously complete a plurality of specified operations, thereby achieving a technical effect of simultaneously completing the plurality of specified operations by the virtual operation object. Therefore, the current technical problem that a plurality of operations cannot be simultaneously performed on the virtual operation object is resolved, the electronic device is helped to simultaneously perform parallel processing on the plurality of specified operations, computing resources of the mobile terminal are fully used, thereby improving processing efficiency of performing the plurality of specified operations.

In the embodiments provided in the present disclosure, a quantity of interactive input ends (interactive objects) is increased by using the folded screen, so that movement of the virtual operation object, aiming of a shooting target, and a readily-performed shooting operation may be simultaneously implemented.

In some embodiments of the present disclosure, after the setting a target region of the back display region as a touch detection region, the method further includes:
  simultaneously moving a virtual operation object in the target game application, moving a crosshair of a virtual attack prop used by the virtual operation object, and performing a target attack operation by using the virtual attack prop in a case that a first touch operation in the touch detection region, a second touch operation performed on a first virtual joystick, and a third touch operation performed on a second virtual joystick are simultaneously detected; and
  respectively displaying a first virtual joystick and a second virtual joystick in a left side subregion and a right side subregion of the front display region or respectively displaying the first virtual joystick and the second virtual joystick in the right side subregion and the left side subregion of the front display region in a case that the front display region is displayed in the landscape mode, the left side subregion and the right side subregion of the front display region being non-overlapping, the first virtual joystick being configured for moving a virtual operation object in the target game application, the second virtual joystick being configured for moving a crosshair of a virtual attack prop used by the virtual operation object, and the second virtual joystick being different from the interactive object in the first interaction interface.

In some embodiments, an operation similar to that on a handle is implemented by performing operation on the back surface of the folded screen, i.e., the movement of the virtual operation object, the aiming of the shooting target, and the shooting operation may be simultaneously controlled.

In some embodiments of the present disclosure, after the setting a third subregion and a fourth subregion of the back display region as the touch detection regions, the method further includes at least one of the following:
  switching the virtual prop currently used by the virtual operation object to a first virtual attack prop in a case that a fourth touch operation is detected in the third subregion and a virtual prop currently used by the virtual operation object is a second virtual attack prop;
  controlling the virtual operation object to perform an attack operation by using the first virtual attack prop in a case that a fifth touch operation is detected in the third subregion and the virtual prop currently used by the virtual operation object is the first virtual attack prop;
  switching the virtual prop currently used by the virtual operation object to the second virtual attack prop in a case that a sixth touch operation is detected in the fourth subregion and the virtual prop currently used by the virtual operation object is the first virtual attack prop; and
  controlling the virtual operation object to perform an attack operation by using the second virtual attack prop in a case that a seventh touch operation is detected in the fourth subregion and the virtual prop currently used by the virtual operation object is the second virtual attack prop.

In an embodiment, touch operations corresponding to left and right hands may trigger different virtual attack props (weapons) according to the region division of the display screen of the mobile terminal.

In an embodiment of the present disclosure, after the switching from displaying the first interaction interface in the front display region to displaying the second interaction interface, the method further includes:

detecting a second interaction operation in the back display region, the second interaction operation being used for switching from displaying the second interaction interface in the front display region to displaying the first interaction interface; and switching from displaying the second interaction interface in the front display region to displaying the first interaction interface in response to the second interaction operation.

The switching from displaying the second interaction interface in the front display region to displaying the first interaction interface in response to the second interaction operation includes:

displaying a first countdown in the back display region in response to the second interaction operation; and displaying the first interaction interface in the front display region after the first countdown ends.

Figure 14:
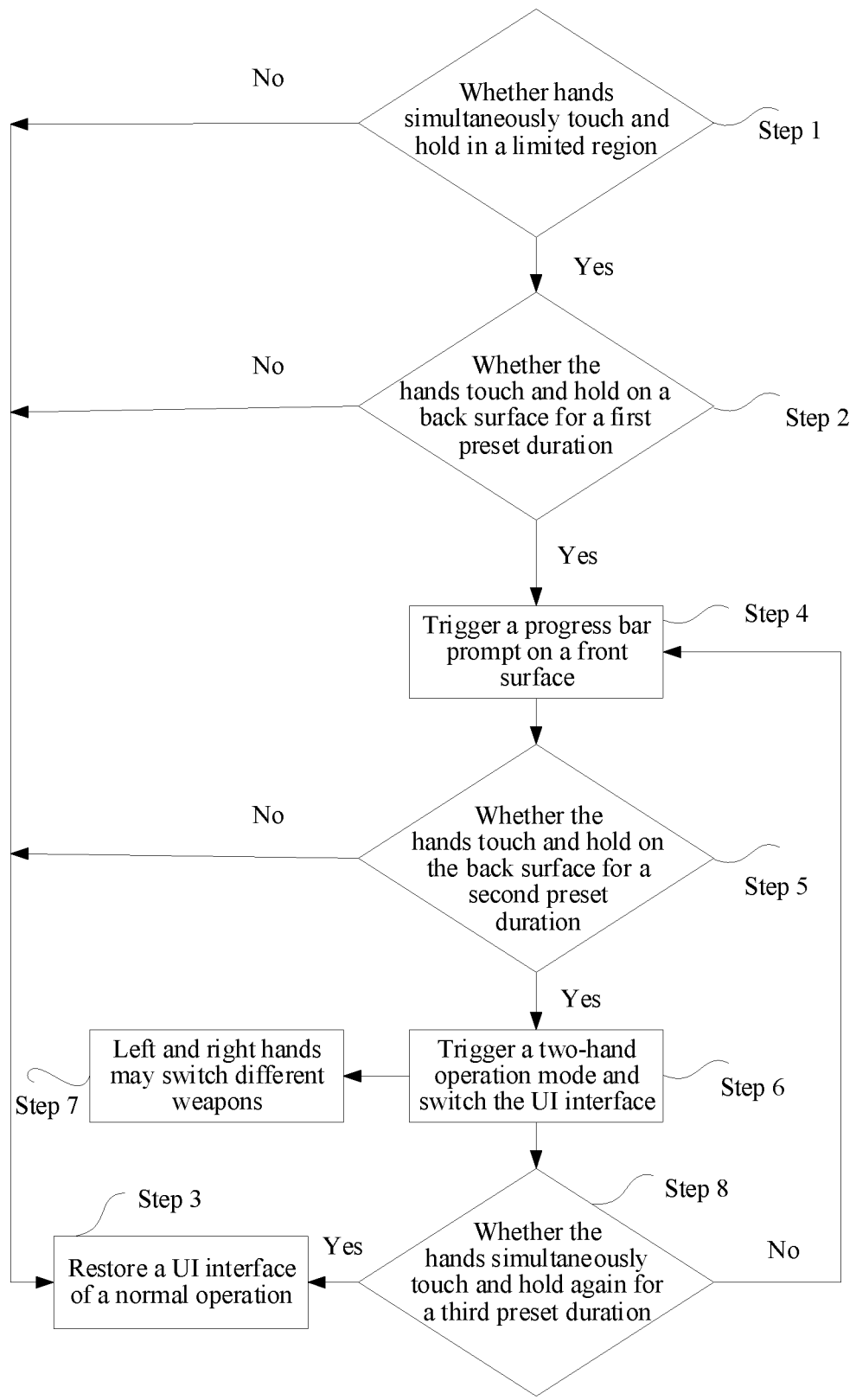
FIG. 14 is a flowchart of an exemplary method for a multi-touch operation mode of a folded screen according to an embodiment of the present disclosure.

In an embodiment of the present disclosure, the present disclosure further provides a method for a multi-touch operation mode of a folded screen. FIG. 14 shows a flowchart of an example method for a multi-touch operation mode of a folded screen.

Operation 1: Determine whether hands simultaneously touch and hold in a limited region; if yes, perform operation 2; and if no, perform operation 3.

In operation 1, touch operations (touch and hold operations) are simultaneously detected in different subregions of a back display region, as shown in FIG. 10, two touch regions are simultaneously touched.

Operation 2: Determine whether the hands touch and hold on a back surface for a first preset duration; if yes, perform operation 4; and if no, perform operation 3.

Operation 3: Restore a UI interface of a normal operation.

Operation 4: Trigger a progress bar prompt on a front surface.

Operation 5: Determine whether the hands touch and hold on the back surface for a second preset duration; if yes, perform operation 6; and if no, perform operation 3.

Operation 6: Trigger a two-hand operation mode and switch the UI interface.

Operation 7: Left and right hands may switch different weapons.

Operation 8: Determine whether the hands simultaneously touch and hold again for a third preset duration; if yes, perform operation 3; and if no, perform operation 4.

Figure 15:
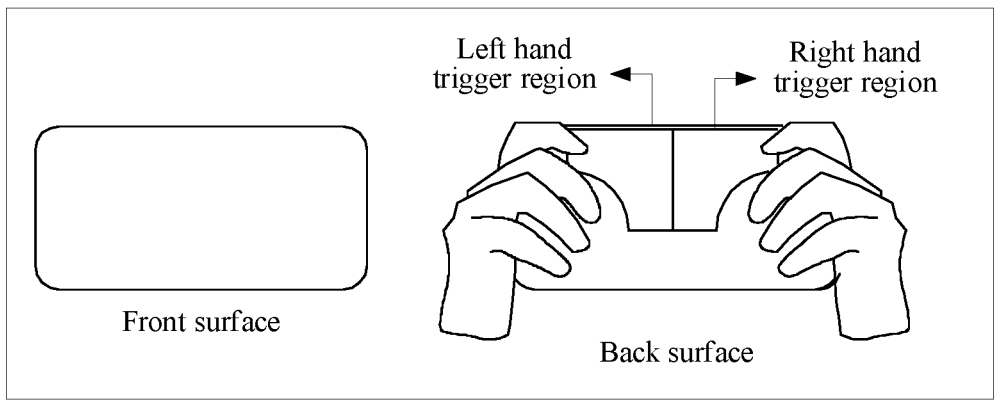
FIG. 15 is an illustration of an example UI interface in a normal operation mode according to an embodiment of the present disclosure.
Figure 16:
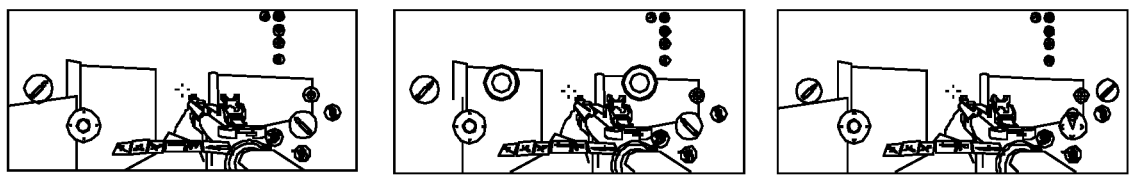
FIG. 16 shows a first interaction interface according to an embodiment of the present disclosure.
Figure 17:
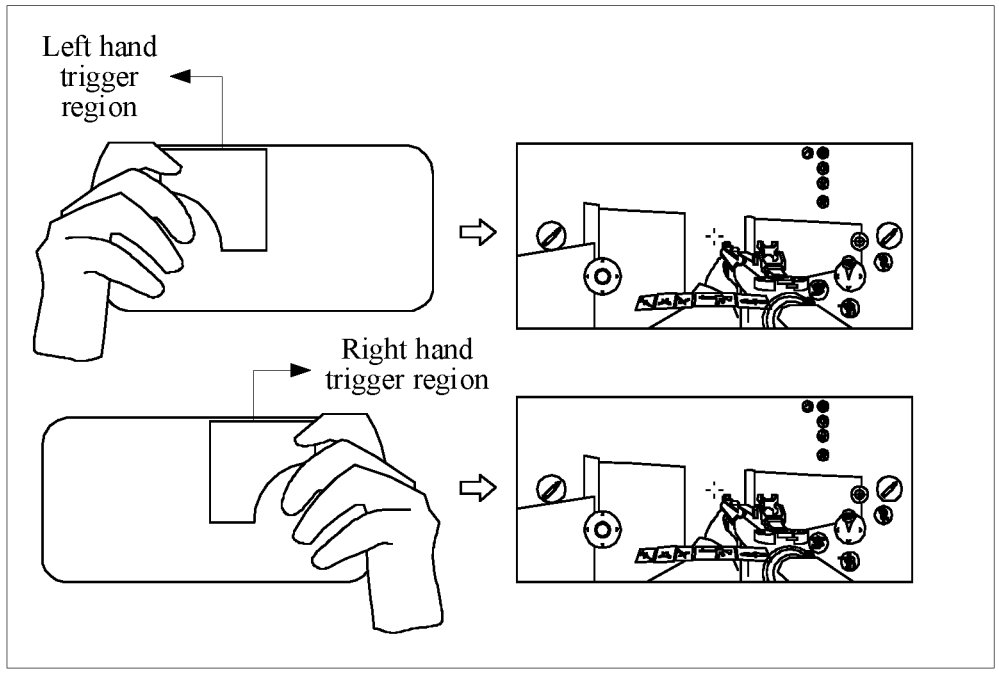
FIG. 17 shows a second interaction interface according to an embodiment of the present disclosure.

As shown in FIG. 15, in an exemplary UI interface in a normal operation mode according to an embodiment of the present disclosure, the user may trigger the two-hand operation mode after simultaneously touching and holding in fixed regions of the back surface of the folded screen respectively with two hands for n seconds. That is, a first interaction interface shown in FIG. 16 is entered after the user touches and holds in a left side trigger region and a right side trigger region respectively with two hands on the back surface of the folded screen for n seconds (the operation on the front surface can be performed or not). The moment at which the user starts to touch and hold the fixed regions is a starting point O at 0 seconds, a countdown for the two-hand operation mode (a game picture in the middle of FIG. 16) is triggered after the duration of the touching and holding on the back surface with two hands reaches X seconds, and the two-hand operation mode (the rightmost display picture in FIG. 16) is successfully triggered after the duration of the touching and holding reaches Y seconds. FIG. 17 shows a second interaction interface according to an embodiment of the present disclosure. Different operation weapons may be switched by tapping the left side trigger region and the right side trigger region on the back surface of the folded screen, and a normal operation interface may be restored by touching and holding again for a specific time. As shown in FIG. 17, a left side touch button controls weapons on the left hand, and a right side touch button controls weapons on the right hand.

In an embodiment, the user may trigger the countdown for the two-hand operation mode after touching and holding on the back surface for X seconds (the first preset duration) with two hands, and trigger the two-hand operation mode after touching and holding for Y seconds (the second preset duration). A first weapon can be used by tapping on the left side of the back surface, and a second weapon can be used by tapping on the right side of the back surface. The user may cancel the countdown for the two-hand operation mode by touching and holding for X seconds again, and cancel the two-hand operation mode by touching and holding for Y seconds.

In an embodiment, a quantity of concurrent inputs is increased, that is, a reverse screen of the dual screen is used as an input dimension, so that the concurrent inputs of the player in a mobile phone game are increased, thereby increasing functionality and experience of game interaction; and tactile feedback is used to improve operation experience of the reverse screen in a folded state of the folded screen/dual screen, so that the weapons can be quickly switched, to enable the player get better interactive prompts and feedback.

For ease of description, the foregoing method embodiments are described as a combination of a series of actions. However, a person skilled in the art is to learn that the present disclosure is not limited to the described action sequence since some operations may be performed in other sequences or simultaneously according to the present disclosure. In addition, a person skilled in the art is further to learn that the embodiments described in this specification are some embodiments of the present disclosure, and the related actions and modules are not necessarily mandatory to the present disclosure.

Figure 18:
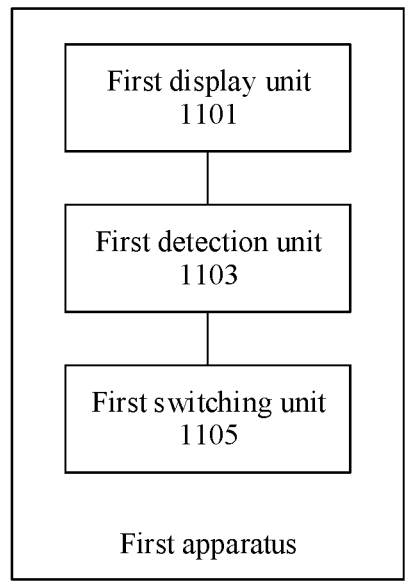
FIG. 18 is a schematic structural diagram of an exemplary apparatus for displaying an interaction interface according to an embodiment of the present disclosure.

According to the embodiments of the present disclosure, a display apparatus of an interaction interface for implementing the foregoing method for displaying the interaction interface is further provided. As shown in FIG. 18, the exemplary first apparatus includes: a first display unit 1101, a first detection unit 1103, and a first switching unit 1105.

The first display unit 1101 is configured to display a first interaction interface of a target game application in a front display region of a display screen of a mobile terminal, the display screen including the front display region and a back display region respectively located on different sides of the mobile terminal.

The first detection unit 1103 is configured to detect a first interaction operation in the back display region, the first interaction operation being used for switching from displaying the first interaction interface in the front display region to displaying a second interaction interface of the target game application.

The first switching unit 1105 is configured to switch from displaying the first interaction interface in the front display region to displaying the second interaction interface in response to the first interaction operation, the second interaction interface including an interactive object different from an interactive object in the first interaction interface.

In some embodiments of the present disclosure, the first detection unit 1103 may include: a first detection module, configured to simultaneously detect touch operations in different subregions of the back display region, the first interaction operation including the touch operation.

The first detection module may include:
- a first detection sub-module, configured to simultaneously detect a touch and hold operation in a first subregion and a second subregion of the back display region, the touch operation including the touch and hold operation; or
- a second detection sub-module, configured to simultaneously detect a double-tap operation in a first subregion and a second subregion of the back display region, the touch operation including the double-tap operation; or
- a third detection sub-module, configured to simultaneously detect a single-tap operation in a first subregion and a second subregion of the back display region, the touch operation including the single-tap operation.
- the first subregion and the second subregion are respectively located in a left side region and a right side region of the back display region in a case that the back display region is displayed in a landscape mode, the first subregion and the second subregion being non-overlapping in the back display region.

In some embodiments of the present disclosure, the first switching unit 1105 may include:
- a first display module, configured to respectively display a first virtual joystick and a second virtual joystick in a left side subregion and a right side subregion of the front display region or respectively display the first virtual joystick and the second virtual joystick in the right side subregion and the left side subregion of the front display region in a case that the front display region is displayed in the landscape mode, the left side subregion and the right side subregion of the front display region being non-overlapping, the first virtual joystick being configured for moving a virtual operation object in the target game application, the second virtual joystick being configured for moving a crosshair of a virtual attack prop used by the virtual operation object, and the second virtual joystick being different from the interactive object in the first interaction interface.

The first switching unit 1105 may further include:
- a fourth display module, configured to display a second countdown in the front display region in response to the first interaction operation; and
- a fifth display module, configured to display the second interaction interface in the front display region after the second countdown ends.

In the embodiments provided in the present disclosure, the first display unit 1101 displays a first interaction interface of a target game application in a front display region of a display screen of a mobile terminal, the display screen including the front display region and a back display region respectively located on different sides of the mobile terminal. The first detection unit 1103 detects a first interaction operation in the back display region, the first interaction operation being used for switching from displaying the first interaction interface in the front display region to displaying a second interaction interface of the target game application. The first switching unit 1105 switches from displaying the first interaction interface in the front display region to displaying the second interaction interface in response to the first interaction operation, the second interaction interface including an interactive object different from an interactive object in the first interaction interface.

In an embodiment of the present disclosure, the apparatus may further include: a setting unit, configured to set a target region of the back display region as a touch detection region in response to the first interaction operation, the target region being configured for detecting a target touch operation, and the target touch operation being used for controlling a virtual operation object in the target game application to perform a target attack operation by using a virtual attack prop.

The setting unit may further include:
- a first setting module, configured to set a third subregion of the back display region as the touch detection region, the target region including the third subregion; or
- a second setting module, configured to set a third subregion and a fourth subregion of the back display region as the touch detection regions, the target region including the third subregion and the fourth subregion, the third subregion and the fourth subregion being respectively located in the left side region and the right side region of the back display region in a case that the back display region is displayed in the landscape mode, and the third subregion and the fourth subregion being non-overlapping in the back display region.

In an embodiment of the present disclosure, the apparatus may further include:
- a first control unit, configured to: simultaneously move a virtual operation object in the target game application, move a crosshair of a virtual attack prop used by the virtual operation object, and perform a target attack operation by using the virtual attack prop after the setting a target region of the back display region as a touch detection region in a case that a first touch operation in the touch detection region, a second touch operation performed on a first virtual joystick, and a third touch operation performed on a second virtual joystick are simultaneously detected; and
- respectively display a first virtual joystick and a second virtual joystick in a left side subregion and a right side subregion of the front display region or respectively display the first virtual joystick and the second virtual joystick in the right side subregion and the left side subregion of the front display region in a case that the front display region is displayed in the landscape mode, the left side subregion and the right side subregion of the front display region being non-overlapping, the first virtual joystick being configured for moving a virtual operation object in the target game application, the second virtual joystick being configured for moving a crosshair of a virtual attack prop used by the virtual operation object, and the second virtual joystick being different from the interactive object in the first interaction interface.

In an embodiment of the present disclosure, the apparatus may further include:
- a second switching unit, configured to switch the virtual prop currently used by the virtual operation object to a first virtual attack prop after the setting a third subregion and a fourth subregion of the back display region as the touch detection regions in a case that a fourth touch operation is detected in the third subregion and a virtual prop currently used by the virtual operation object is a second virtual attack prop;
- a second control unit, configured to control the virtual operation object to perform an attack operation by using the first virtual attack prop in a case that a fifth touch operation is detected in the third subregion and the virtual prop currently used by the virtual operation object is the first virtual attack prop;
- a third switching unit, configured to switch the virtual prop currently used by the virtual operation object to the second virtual attack prop in a case that a sixth touch operation is detected in the fourth subregion and the virtual prop currently used by the virtual operation object is the first virtual attack prop; and a third control unit, configured to control the virtual operation object to perform an attack operation by using the second virtual attack prop in a case that a seventh touch operation is detected in the fourth subregion and the virtual prop currently used by the virtual operation object is the second virtual attack prop.

In an embodiment of the present disclosure, the apparatus may further include:

a second detection unit, configured to detect a second interaction operation in the back display region after the switching from displaying the first interaction interface in the front display region to displaying the second interaction interface, the second interaction operation being used for switching from displaying the second interaction interface in the front display region to displaying the first interaction interface; and a fourth switching unit. configured to switch from displaying the second interaction interface in the front display region to displaying the first interaction interface in response to the second interaction operation.

The fourth switching unit may include:

a second display module, configured to display a first countdown in the back display region in response to the second interaction operation; and a third display module, configured to display the first interaction interface in the front display region after the first countdown ends.

Figure 19:
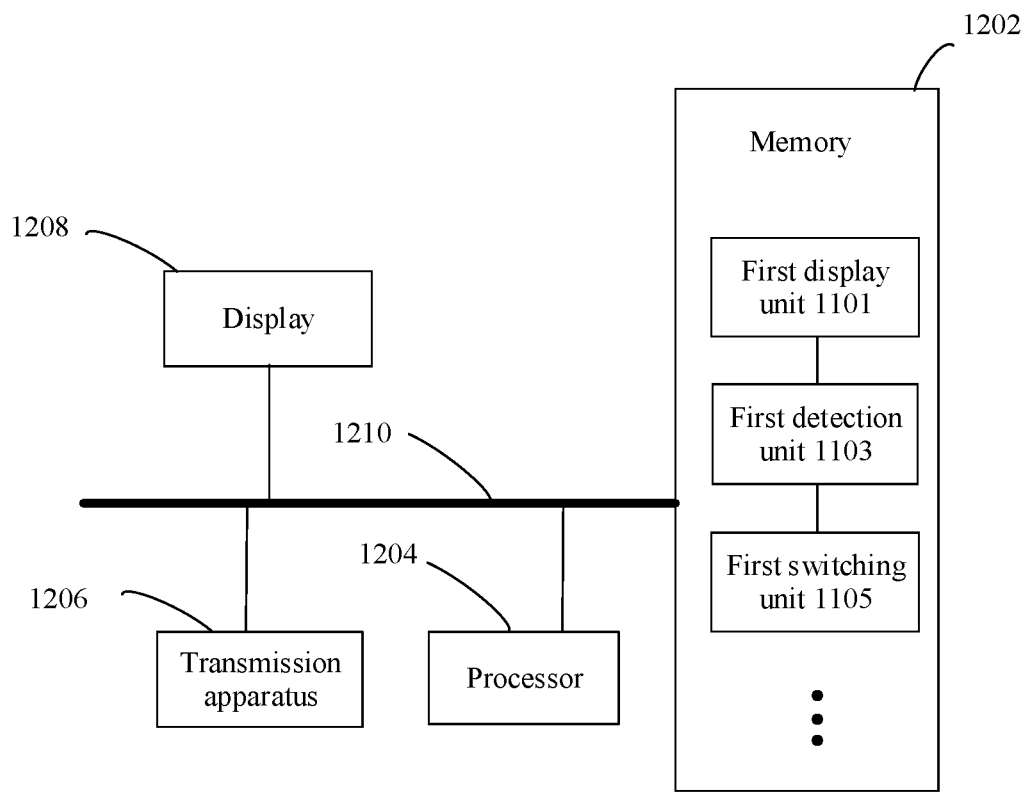
FIG. 19 is a schematic structural diagram of an electronic device for a method for displaying an interaction interface according to an embodiment of the present disclosure.

According to still another aspect of the embodiments of the present disclosure, an electronic device for implementing the foregoing method for displaying an interaction interface is further provided. As shown in FIG. 19, the electronic device includes a memory 1202 and a processor 1204. The memory 1202 stores a computer program, and the processor 1204 is configured to perform operations in any one of the above method embodiments by using the computer program.

In some embodiments of the present disclosure, the foregoing electronic device may be located in at least one of a plurality of network devices in a computer network.

In some embodiments of the present disclosure, the processor may be configured to perform the following operations by using the computer program:

S1: Display a first interaction interface of a target game application in a front display region of a display screen of a mobile terminal, the display screen including the front display region and a back display region respectively located on different sides of the mobile terminal.

S2: Detect a first interaction operation in the back display region, the first interaction operation being used for switching from displaying the first interaction interface in the front display region to displaying a second interaction interface of the target game application.

S3: Switch from displaying the first interaction interface in the front display region to displaying the second interaction interface in response to the first interaction operation, the second interaction interface including an interactive object different from an interactive object in the first interaction interface.

A person of ordinary skill in the art may understand that, the structure shown in FIG. 19 is only schematic. The electronic device may be a terminal device such as a smartphone (such as an Android mobile phone or an iOS mobile phone), a tablet computer, a palmtop computer, a mobile Internet device (MID), or a PAD. FIG. 19 does not constitute a limitation to the structure of the electronic device. For example, the electronic device may further include more or fewer components (such as a network interface) than those shown in FIG. 19, or have a configuration different from that shown in FIG. 19.

The memory 1202 may be configured to store a software program and module, for example, a program instruction/module corresponding to the method and apparatus for displaying an interaction interface in the embodiments of the present disclosure. The processor 1204 runs the software program and module stored in the memory 1202, to perform various functional application and data processing, that is, implement the foregoing method for displaying an interaction interface. The memory 1202 may include a high-speed random memory, and may also include a non-volatile memory, for example, one or more magnetic storage apparatuses, a flash memory, or another non-volatile solid-state memory. In some embodiments, the memory 1202 may include memories remotely disposed relative to the processor 1204, and the remote memories may be connected to a terminal through a network. Examples of the network include, but are not limited to, the Internet, an intranet, a local area network, a mobile communication network and a combination thereof. The memory 1202 may specifically store, but is not limited to, attribute information of the virtual operation object and the interaction interface. In an example, as shown in FIG. 19, the foregoing memory 1202 may include, but is not limited to, the first display unit 1101, the first detection unit 1103, and the first switching unit 1105 in the foregoing apparatus for displaying an interaction interface. In addition, the memory may further include, but is not limited to, other modules and units in the foregoing apparatus for displaying an interaction interface. Details are not described herein again.

In some embodiments of the present disclosure, a transmission apparatus 1206 is configured to receive or transmit data by using a network. A specific example of the foregoing network may include a wired network and a wireless network. In an example, the transmission apparatus 1206 includes a network interface controller (NIC). The NIC may be connected to another network device and a router by using a network cable, so as to communicate with the Internet or a local area network. In an example, the transmission apparatus 1206 is a radio frequency (RF) module, which communicates with the Internet in a wireless manner.

In addition, the foregoing electronic device further includes: a display 1208, configured to display the interaction interface of the foregoing target game application; and a connection bus 1210, configured to connect various modular components in the foregoing electronic device.

According to still another aspect of the embodiments of the present disclosure, a computer-readable storage medium is further provided. The computer-readable storage medium stores a computer program, the computer program being configured to perform, when run, operations in any one of the foregoing method embodiments.

In the embodiments of the present disclosure, the computer-readable storage medium may be configured to store a computer program, configured to perform the following operations:

S1: Display a first interaction interface of a target game application in a front display region of a display screen of a mobile terminal, the display screen including the front display region and a back display region respectively located on different sides of the mobile terminal.

S2: Detect a first interaction operation in the back display region, the first interaction operation being used for switching from displaying the first interaction interface in the front display region to displaying a second interaction interface of the target game application.

S3: Switch from displaying the first interaction interface in the front display region to displaying the second interaction interface in response to the first interaction operation, the second interaction interface including an interactive object different from an interactive object in the first interaction interface.

In the embodiments of the present disclosure, a person of ordinary skill in the art may understand that all or some of the operations of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

The sequence numbers of the foregoing embodiments of the present disclosure are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such understanding, the technical solutions of the present disclosure essentially, or the part contributing to the prior art, or all or some of the technical solutions may be implemented in the form of a software product. The computer software product is stored in a storage medium and includes several instructions for instructing one or more computer devices (which may be a personal computer, a server, a network device, or the like) to perform all or some of operations of the methods in the embodiments of the present disclosure.

In the foregoing embodiments of the present disclosure, the descriptions of the embodiments have respective focuses. For a part that is not described in detail in an embodiment, reference may be made to related descriptions in other embodiments.

In the several embodiments provided in the present disclosure, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in a form of hardware, or may be implemented in a form of a software functional unit.

The foregoing descriptions are some embodiments of the present disclosure. A person of ordinary skill in the art may make several improvements and refinements without departing from the principle of the present disclosure, and the improvements and refinements shall fall within the protection scope of the present disclosure.

What is claimed is:

1. A method for displaying an interaction interface, performed by an electronic device the method comprising:
    displaying a first front interaction content of a target game application in a front display region of a foldable mobile terminal,
        wherein the foldable mobile terminal comprises the front display region and a back display region respectively located on opposite sides of the foldable mobile terminal in a folded position; and
    switching a display on the front display region from displaying the first front interaction content to displaying a second front interaction content, based on detecting a first back interaction operation in the back display region of the foldable mobile terminal,
        wherein the first back interaction operation comprises two or more touch operations in different subregions of the back display region the foldable mobile terminal,
        wherein the first front interaction content comprises a first interactive object, and
        wherein the second front interaction content comprises a second interactive object different from the first interactive object in the first front interaction content.

2. The method according to claim 1, wherein the detecting of the first back interaction operation in the back display region comprises:
    simultaneously detecting a touch operation in the different subregions of the back display region, the first back interaction operation comprising the touch operation.

3. The method according to claim 2, wherein the simultaneously detecting the touch operation in the different subregions of the back display region comprises:
    simultaneously detecting a touch and hold operation in a first subregion and a second subregion of the back display region, the touch operation comprising the touch and hold operation; or
    simultaneously detecting a double-tap operation in the first subregion and the second subregion of the back display region, the touch operation comprising the double-tap operation; or
    simultaneously detecting a single-tap operation in the first subregion and the second subregion of the back display region, the touch operation comprising the single-tap operation.

4. The method according to claim 3, wherein the first subregion and the second subregion are respectively located in a left side region and a right side region of the back display region based on the back display region being displayed in a landscape mode, the first subregion and the second subregion being non-overlapping in the back display region.

5. The method according to claim 1, wherein the switching comprises:
    respectively displaying a first virtual joystick and a second virtual joystick in a left side subregion and a right side subregion of the front display region or respectively displaying the first virtual joystick and the second virtual joystick in the right side subregion and the left side subregion of the front display region based on the front display region being displayed in a landscape mode,
  wherein the left side subregion and the right side subregion of the front display region are non-overlapping,
  wherein the first virtual joystick is configured for moving a virtual operation object in the target game application,
  wherein the second virtual joystick is configured for moving a crosshair of a virtual attack prop used by the virtual operation object, and
  wherein the second virtual joystick is different from the first interactive object in the first front interaction content.

6. The method according to claim 1, further comprising:
setting a target region on the back display region as a touch detection region in response to the first back interaction operation,
  wherein the target region is configured for detecting a target touch operation, and
  wherein the target touch operation is used for controlling a virtual operation object in the target game application to perform a target attack operation by using a virtual attack prop.

7. The method according to claim 6, wherein the setting of the target region of the back display region as the touch detection region comprises:
  setting a third subregion of the back display region as the touch detection region, the target region comprising the third subregion; or
  setting the third subregion and a fourth subregion of the back display region as touch detection regions,
    wherein the target region comprises the third subregion and the fourth subregion,
    wherein the third subregion and the fourth subregion are respectively located in a left side region and a right side region of the back display region based on the back display region being displayed in a landscape mode, and
    wherein the third subregion and the fourth subregion are non-overlapping in the back display region.

8. The method according to claim 6, the method further comprises:
  simultaneously moving the virtual operation object in the target game application, moving a crosshair of the virtual attack prop used by the virtual operation object, and performing the target attack operation by using the virtual attack prop based on simultaneously detecting a first touch operation in the touch detection region, a second touch operation performed on a first virtual joystick, and a third touch operation performed on a second virtual joystick; wherein
  the first virtual joystick and the second virtual joystick are respectively displayed in a left side subregion and a right side subregion of the front display region, or the first virtual joystick and the second virtual joystick are respectively displayed in the right side subregion and the left side subregion of the front display region based on the front display region being displayed in a landscape mode, the left side subregion and the right side subregion of the front display region being non-overlapping, the first virtual joystick being configured for moving the virtual operation object in the target game application, the second virtual joystick being configured for moving the crosshair of the virtual attack prop used by the virtual operation object, and the second virtual joystick being different from the first interactive object in the first front interaction content.

9. The method according to claim 7, wherein the method further comprises at least one of the following:
  switching a virtual prop currently used by the virtual operation object to a first virtual attack prop based on detecting a fourth touch operation in the third subregion and the virtual prop currently used by the virtual operation object being a second virtual attack prop;
  controlling the virtual operation object to perform an attack operation by using the first virtual attack prop based on a fifth touch operation being detected in the third subregion and the virtual prop currently used by the virtual operation object is the first virtual attack prop;
  switching the virtual prop currently used by the virtual operation object to the second virtual attack prop based on a sixth touch operation being detected in the fourth subregion and the virtual prop currently used by the virtual operation object being the first virtual attack prop; and
  controlling the virtual operation object to perform an attack operation by using the second virtual attack prop based on a seventh touch operation being detected in the fourth subregion and the virtual prop currently used by the virtual operation object being the second virtual attack prop.

10. The method according to claim 1, the method further comprises:
  detecting a second back interaction operation in the back display region; and
  in response to the second back interaction operation, switching the display on the front display region from displaying the second front interaction content to displaying the first front interaction content in the front display region.

11. The method according to claim 10, wherein the switching from displaying the second front interaction content comprises:
  displaying a countdown in the back display region in response to the second back interaction operation; and
  displaying the first front interaction content in the front display region after the countdown ends.

12. The method according to claim 1, wherein the switching the display on the front display region from displaying the first front interaction content to displaying the second front interaction content comprises:
  displaying a countdown in the front display region in response to the first back interaction operation; and
  displaying the second front interaction content in the front display region after the countdown ends.

13. An apparatus for displaying an interaction interface, the apparatus comprising:
  at least one memory configured to store program code; and
  at least one processor configured to read the program code and operate as instructed by the program code, the program code comprising:
    display code configured to cause the at least one processor to display a first front interaction content of a target game application in a front display region of a foldable mobile terminal,
    wherein the foldable the mobile terminal comprises the front display region and a back display region respectively located on opposite sides of the foldable mobile terminal in a folded position; and first switching code configured to cause the at least one processor to switch a display on the front display region from displaying the first front interaction content to displaying a second front interaction content, based on detecting a first back interaction operation in the back display region of the foldable mobile terminal, wherein the first back interaction operation comprises two or more touch operations in different subregions of the back display region of the foldable mobile terminal, wherein the first front interaction content comprises a first interactive object, and wherein the second front interaction content comprises a second interactive object different from the first interactive object in the first front interaction content.

14. The apparatus of claim 13, wherein the first switching code is further configured to cause the at least one processor to simultaneously detect touch operation in the different subregions of the back display region of the foldable mobile terminal, the first back interaction operation comprising the touch operation.

15. The apparatus of claim 13, wherein the first switching code is further configured to cause the at least one processor to respectively display a first virtual joystick and a second virtual joystick in a left side subregion and a right side subregion of the front display region or respectively displaying the first virtual joystick and the second virtual joystick in the right side subregion and the left side subregion of the front display region based on the front display region being displayed in a landscape mode, the left side subregion and the right side subregion of the front display region being non-overlapping, the first virtual joystick being configured for moving a virtual operation object in the target game application, the second virtual joystick being configured for moving a crosshair of a virtual attack prop used by the virtual operation object, and the second virtual joystick being different from the first interactive object in the first front interaction content.

16. The apparatus of claim 13, wherein the program code further comprises:

first setting code configured to cause the at least one processor to set a target region on the back display region as a touch detection region in response to the first back interaction operation, the target region being configured for detecting a target touch operation, and the target touch operation being used for controlling a virtual operation object in the target game application to perform a target attack operation by using a virtual attack prop.

17. The apparatus of claim 16, wherein the first setting code is further configured to cause the at least one processor to:

set a third subregion of the back display region as the touch detection region, the target region comprising the third subregion; or set the third subregion and a fourth subregion of the back display region as touch detection regions, the target region comprising the third subregion and the fourth subregion, the third subregion and the fourth subregion being respectively located in a left side region and a right side region of the back display region based on the back display region being displayed in a landscape mode, and the third subregion and the fourth subregion being non-overlapping in the back display region.

18. The apparatus of claim 17, wherein the program code further comprises at least one of:

second switching code configured to cause the at least one processor to switch a virtual prop currently used by the virtual operation object to a first virtual attack prop based on detecting a fourth touch operation in the third subregion and the virtual prop currently used by the virtual operation object being a second virtual attack prop;

first controlling code configured to cause the at least one processor to control the virtual operation object to perform an attack operation by using the first virtual attack prop based on a fifth touch operation being detected in the third subregion and the virtual prop currently used by the virtual operation object is the first virtual attack prop;

third switching code configured to cause the at least one processor to switch the virtual prop currently used by the virtual operation object to the second virtual attack prop based on a sixth touch operation being detected in the fourth subregion and the virtual prop currently used by the virtual operation object being the first virtual attack prop; and second controlling code configured to cause the at least one processor to control the virtual operation object to perform an attack operation by using the second virtual attack prop based on a seventh touch operation being detected in the fourth subregion and the virtual prop currently used by the virtual operation object being the second virtual attack prop.

19. The apparatus of claim 13, wherein the first switching code is further configured to cause the at least one processor to:

display a countdown in the front display region in response to the first back interaction operation; and display the second front interaction content in the front display region after the countdown ends.

20. A non-transitory computer-readable storage medium, storing a computer program, the computer program being executable by at least one processor to:

display a first front interaction content of a target game application in a front display region of a foldable mobile terminal, wherein the foldable mobile terminal comprises the front display region and a back display region respectively located on opposite sides of the foldable mobile terminal in a folded position; and switch a display on the front display region from displaying the first front interaction content to displaying a second front interaction content, based on detecting a first back interaction operation in the back display region of the foldable mobile terminal, wherein the first back interaction operation comprises two or more touch operations in different subregions of the back display region of the foldable mobile terminal, wherein the first front interaction content comprises a first interactive object, and wherein the second front interaction content comprises a second interactive object different from the first interactive object in the first front interaction content.

\* \* \* \* \*